US008270577B2

(12) United States Patent
Hao et al.

(10) Patent No.: US 8,270,577 B2
(45) Date of Patent: Sep. 18, 2012

(54) MULTIPLE VISUAL VOICEMAIL MAILBOXES

(75) Inventors: Jack Jianxiu Hao, Lexington, MA (US); Dahai Ren, Waltham, MA (US); Diego Sebastian Rozensztejn, Brookline, MA (US); Robert C. Baruch, Rising Sun, MD (US); Guillermo Ortiz, Brookline, MA (US); Shuai Wu, Waltham, MA (US); Gerald Y. Honma, Aiea, HI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 709 days.

(21) Appl. No.: 12/236,766

(22) Filed: Sep. 24, 2008

(65) Prior Publication Data

US 2009/0154667 A1   Jun. 18, 2009

Related U.S. Application Data

(60) Provisional application No. 61/013,549, filed on Dec. 13, 2007, provisional application No. 61/018,044, filed on Dec. 31, 2007.

(51) Int. Cl.
*H04M 1/64*  (2006.01)
*H04M 11/00*  (2006.01)
*H04M 3/42*  (2006.01)

(52) U.S. Cl. ............ 379/88.22; 379/88.18; 455/414.1

(58) Field of Classification Search ........... 379/88.13, 379/88.12, 88.17, 88.25, 88.22; 455/414.1
See application file for complete search history.

(56) References Cited

U.S. PATENT DOCUMENTS

| | | | | |
|---|---|---|---|---|
| 7,136,461 | B1 * | 11/2006 | Swingle et al. | 379/88.13 |
| 2002/0154745 | A1 * | 10/2002 | Shtivelman | 379/88.12 |
| 2007/0206734 | A1 | 9/2007 | Hagale et al. | |
| 2007/0207785 | A1 * | 9/2007 | Chatterjee et al. | 455/414.1 |
| 2008/0320047 | A1 * | 12/2008 | Miller et al. | 707/104.1 |
| 2009/0061828 | A1 * | 3/2009 | Sigmund et al. | 455/413 |
| 2009/0138687 | A1 * | 5/2009 | Kang | 712/225 |
| 2009/0154667 | A1 * | 6/2009 | Hao et al. | 379/88.18 |
| 2010/0250720 | A1 * | 9/2010 | Gorty | 709/222 |
| 2010/0329434 | A1 * | 12/2010 | Othmer et al. | 379/88.13 |

FOREIGN PATENT DOCUMENTS

WO   2007/002753   1/2007

OTHER PUBLICATIONS

Notification of Transmittal of the International Search Report and the Written Opinion of the International Searching Authority, or the Declaration corresponding to PCT/US 08/84511, Jan. 23, 2009, 11 pages.

* cited by examiner

*Primary Examiner* — Davetta W Goins
*Assistant Examiner* — Mohammad Islam

(57) ABSTRACT

A network device may include a memory to store an aggregate database. The aggregate database may store aggregate voicemail message information, the aggregate voicemail message information including voicemail message information associated with a first device number and voicemail message information associated with a second device number. The network device may include a receiver to receive, over a network, updated voicemail message information associated with the first device number and stored in a first database different from the aggregate database, and to receive, over the network, updated voicemail message information associated with the second device number and stored in a second database different from the first database and the aggregate database. The network device may include a processor to update the aggregate voicemail message information stored in the aggregate database based on the received updated voicemail message information associated with the first device number and based on the received updated voicemail message information associated with the second device number. The network device may include a transmitter to send the updated aggregate voicemail message information to a user device associated with the first device number.

25 Claims, 22 Drawing Sheets

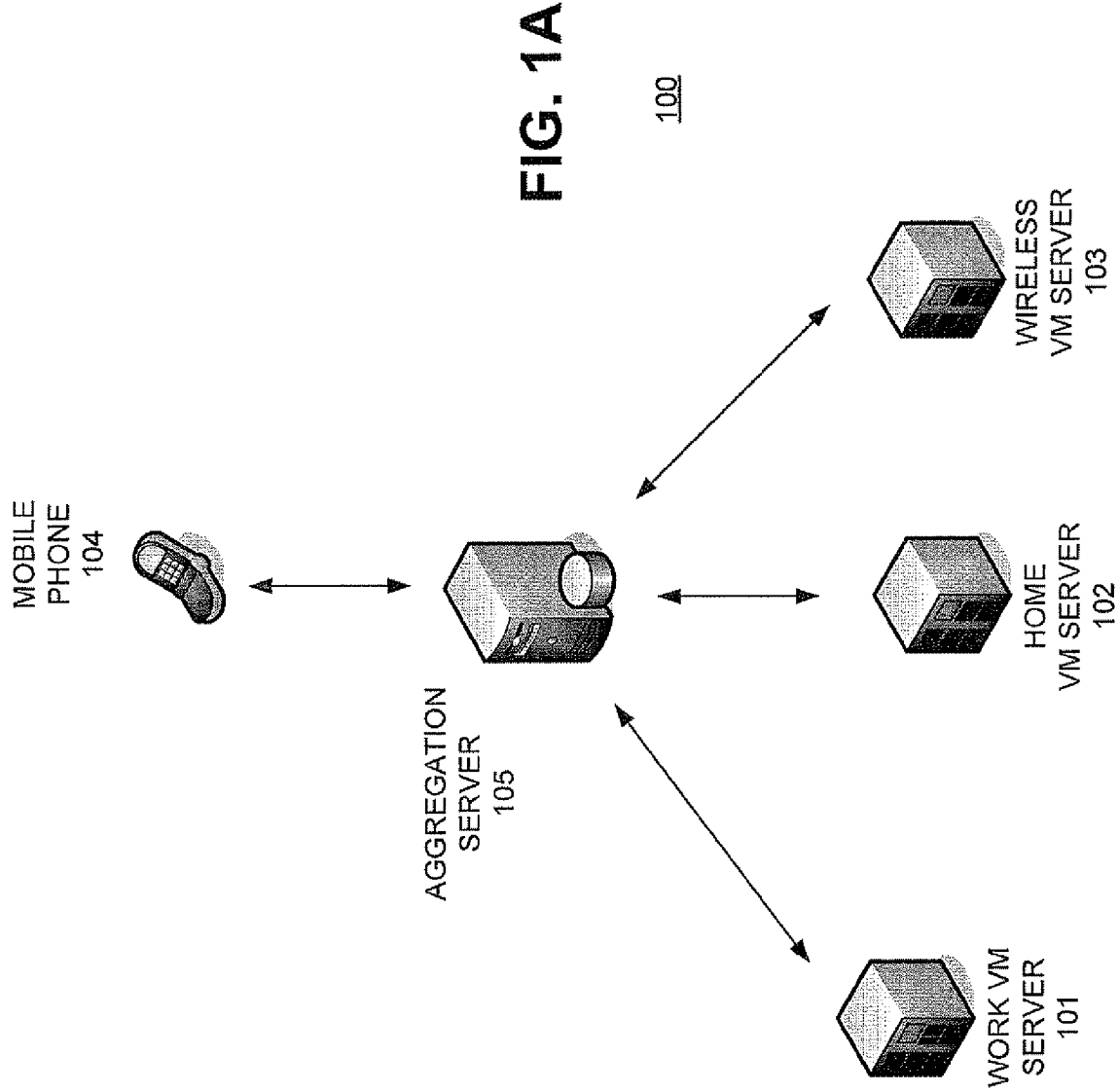

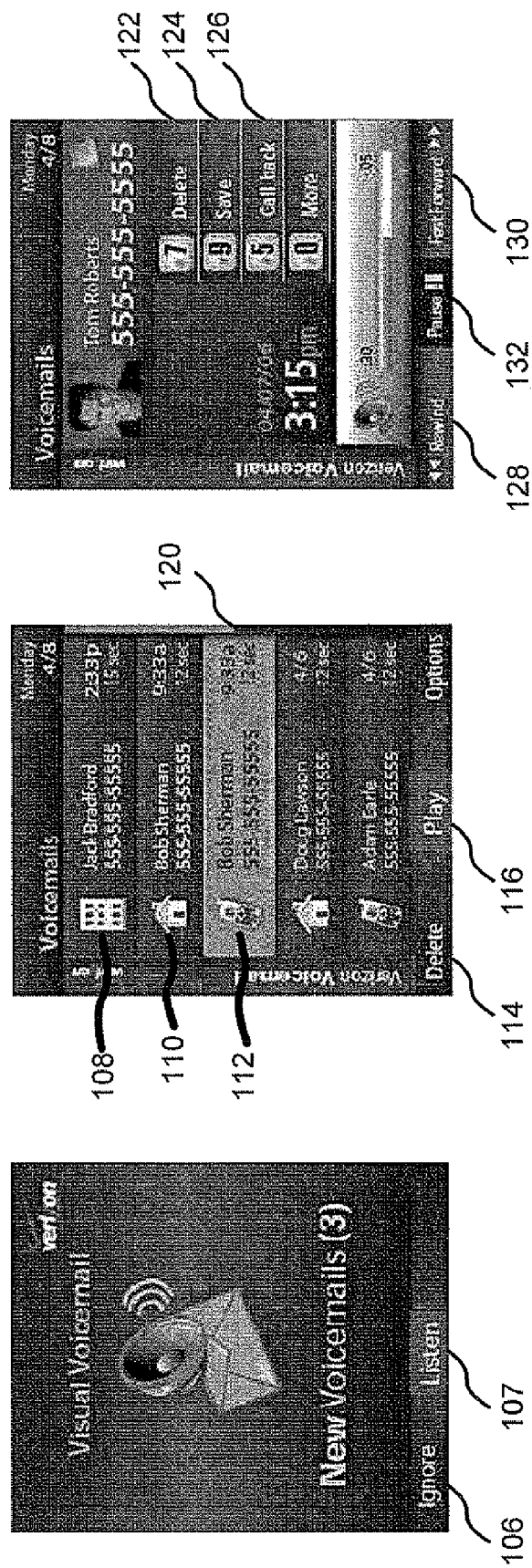

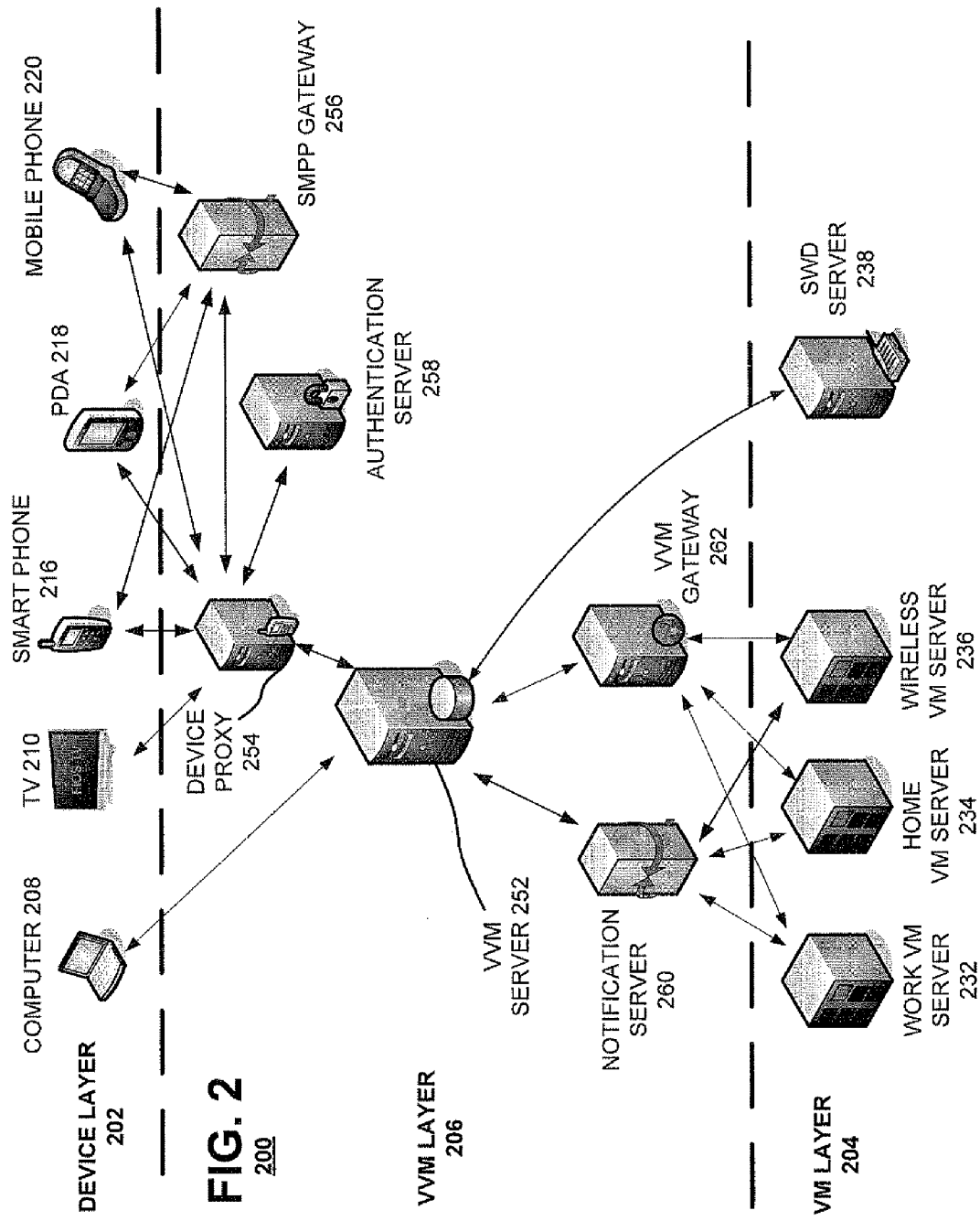

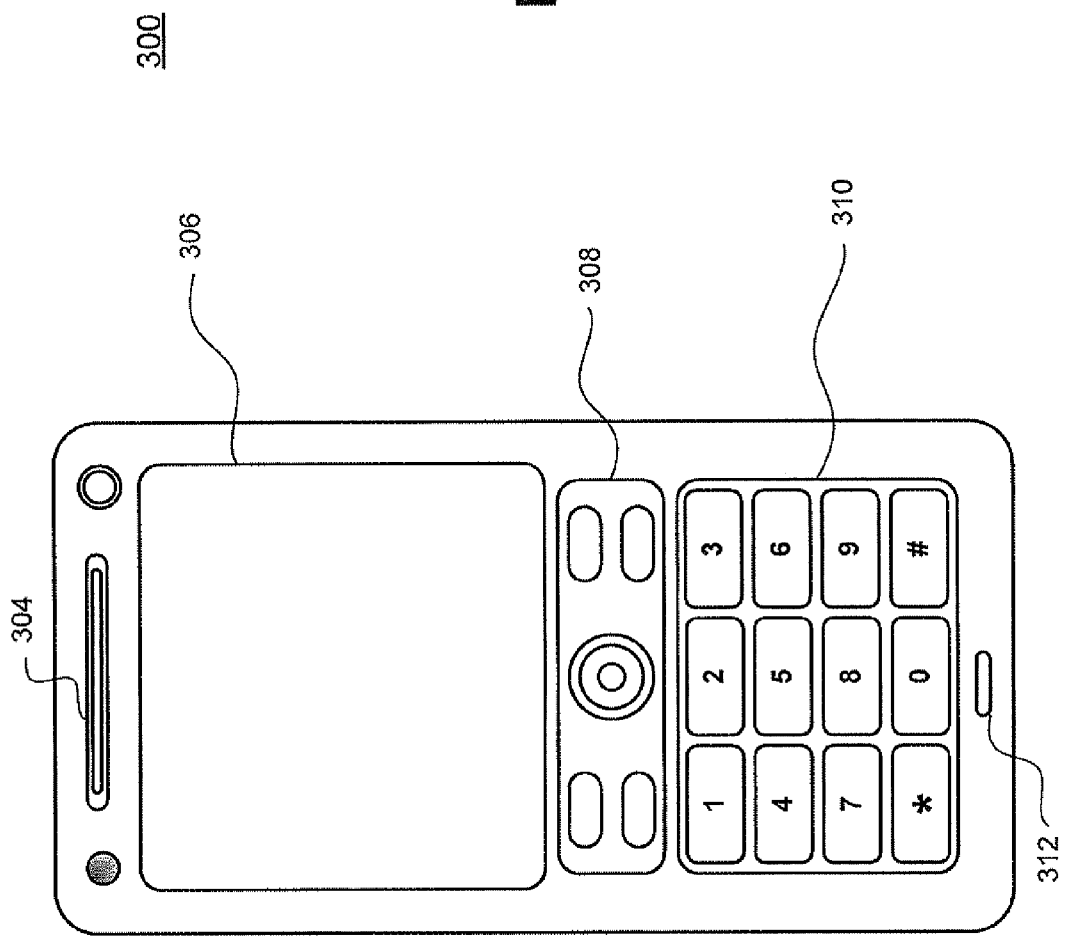

MESSAGE TABLE 600-1

| MAILBOX ID 602 | MESSAGE ID 604 | CALLED DN 605 | CALLER DN 606 | STATE 610 | LOCATION 612 |
|---|---|---|---|---|---|
| MBA1 | A124 | 7035678989 | 2025361234 | HEARD | MSG8.QCP |

652

MESSAGE TABLE 600-2

| MAILBOX ID 602 | MESSAGE ID 604 | CALLED DN 605 | CALLER DN 606 | STATE 610 | LOCATION 612 |
|---|---|---|---|---|---|
| MBB1 | B156 | 2023459292 | 9186321642 | SAVED | MSG2.QCP |

656

MESSAGE TABLE 600-3

| MAILBOX ID 602 | MESSAGE ID 604 | CALLED DN 605 | CALLER DN 606 | STATE 610 | LOCATION 612 |
|---|---|---|---|---|---|
| MBC1 | C129 | 2022513434 | 2018675309 | HEARD | MSG1.QCP |

MESSAGE TABLE 600-1'

| MAILBOX ID 602 | MESSAGE ID 604 | CALLED DN 605 | CALLER DN 606 | STATE 610 | LOCATION 612 |
|---|---|---|---|---|---|
| MBA1 | A124 | 7035678989 | 2025361234 | HEARD | MSG8.QCP |
| MBA1 | A125 | 7035678989 | 2039574986 | NEW | MSG9.QCP |

MESSAGE TABLE 600-2'

| MAILBOX ID 602 | MESSAGE ID 604 | CALLED DN 605 | CALLER DN 606 | STATE 610 | LOCATION 612 |
|---|---|---|---|---|---|
| MBB1 | B156 | 2023459292 | 9186321642 | SAVED | MSG2.QCP |
| MBB1 | B157 | 2023459292 | 3016651233 | NEW | MSG3.QCP |

MESSAGE TABLE 600-3'

| MAILBOX ID 602 | MESSAGE ID 604 | CALLED DN 605 | CALLER DN 606 | STATE 610 | LOCATION 612 |
|---|---|---|---|---|---|
| MBC1 | C129 | 2022513434 | 2018675309 | HEARD | MSG1.QCP |
| MBC1 | C130 | 2022513434 | 4569812124 | NEW | MSG4.QCP |

FIG. 6B

AGGREGATE MESSAGE TABLE 700

| MAILBOX ID 702 | MESSAGE ID 704 | CALLED DN 705 | CALLER DN 706 | STATE 710 | LOCATION 712 |
|---|---|---|---|---|---|
| MBA1 | A124 | 7035678989 | 2025361234 | HEARD | MSG8.QCP |
| MBC1 | C129 | 2022513434 | 2018675309 | HEARD | MSG1.QCP |
| MBB1 | B156 | 2023459292 | 9186321642 | SAVED | MSG2.QCP |

752 — (row 1)
754 — (row 2)
756 — (row 3)

FIG. 7A

AGGREGATE MESSAGE TABLE 700'

| MAILBOX ID 702 | MESSAGE ID 704 | CALLED NO. 705 | CALLER NO. 706 | STATE 710 | LOCATION 712 |
|---|---|---|---|---|---|
| MBA1 | A124 | 7035678989 | 2025361234 | HEARD | MSG8.QCP |
| MBC1 | C129 | 2022513434 | 2018675309 | HEARD | MSG1.QCP |
| MBB1 | B156 | 2023459292 | 9186321642 | SAVED | MSG2.QCP |
| MBB1 | B157 | 2023459292 | 3016651233 | NEW | MSG3.QCP |
| MBC1 | C130 | 2022513434 | 4569812124 | NEW | MSG4.QCP |
| MBA1 | A125 | 7035678989 | 2039574986 | NEW | MSG9.QCP |

MULTIPLE VISUAL VOICEMAIL MAILBOXES

RELATED APPLICATIONS

This U.S. Patent Application claims priority to provisional U.S. patent application Ser. No. 61/013,549 filed Dec. 13, 2007, and provisional U.S. patent application Ser. No. 61/018,044, filed Dec. 31, 2007, the disclosures of both of these applications being incorporated herein by reference.

BACKGROUND INFORMATION

Visual voicemail is a user friendly application that adds a visual aspect to managing voicemail messages. Visual voicemail may enable mobile phone users to manage voicemail message in an order of their choice, e.g., in a random order rather than a sequential order.

BRIEF DESCRIPTION OF THE DRAWINGS

FIG. 1A is a block diagram of an exemplary environment in which embodiments disclosed herein may be implemented;

FIGS. 1B, 1C, and 1D show exemplary visual voicemail graphical user interfaces;

FIG. 2 is a block diagram of an exemplary network in which embodiments described herein may be implemented;

FIG. 3 is a block diagram of an exemplary user device;

FIGS. 6A and 6B are diagrams of exemplary message tables;

FIGS. 7A and 7B are block diagrams of exemplary aggregate message tables;

DETAILED DESCRIPTION OF PREFERRED EMBODIMENTS

Figure 4:
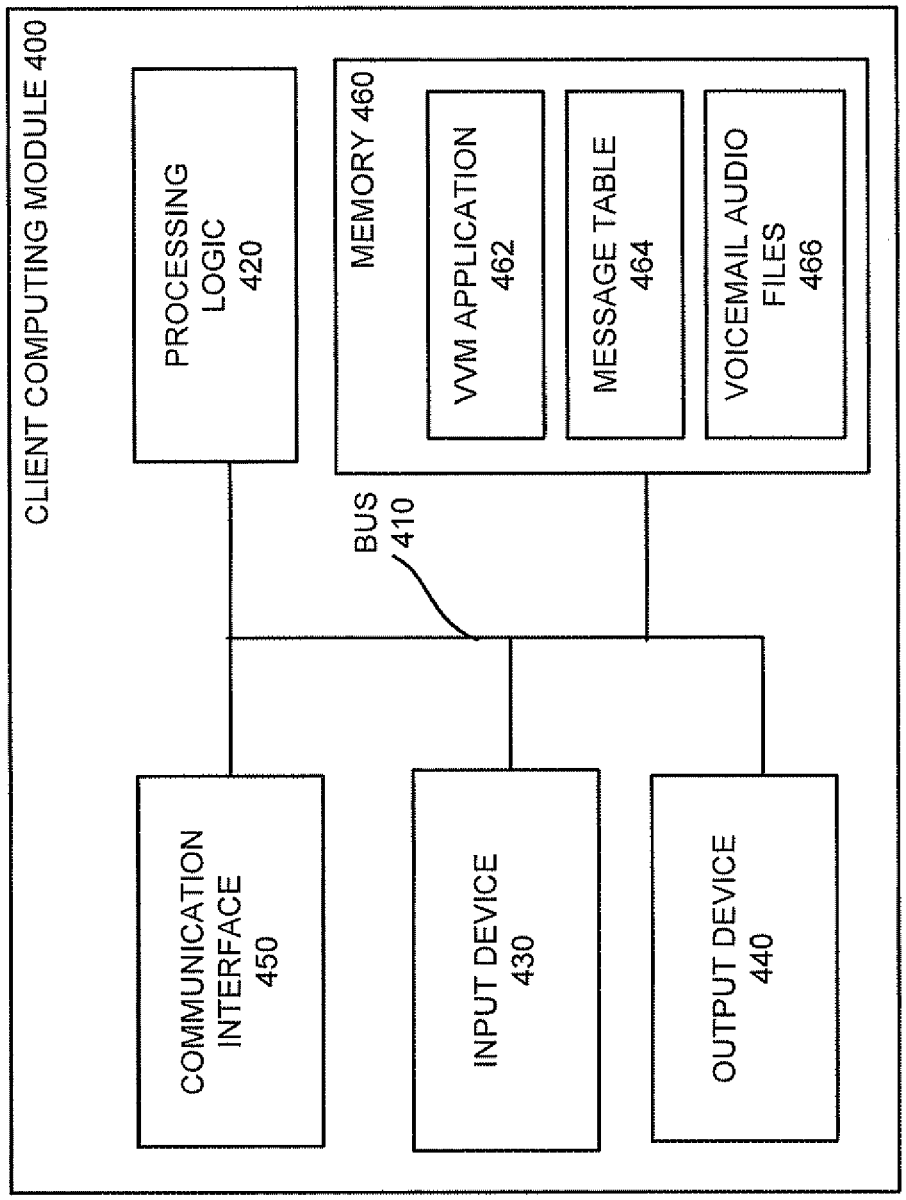
FIG. 4 is a block diagram of exemplary components of a client computer module.

The following detailed description refers to the accompanying drawings. The same reference numbers in different drawings may identify the same or similar elements. Also, the following detailed description does not limit the invention.

A person may have multiple communication devices, such as a home phone, a mobile phone, a smart phone, a personal digital assistant (PDA), a computer, etc. Each of these devices may be associated with a mailbox for receiving voicemail messages. For example, FIG. 1A is a block diagram of an exemplary environment in which embodiments disclosed herein may be implemented. Environment 100 may include a work voicemail (VM) server 101, a home VM server 102, and a wireless VM server 103. In this example, work VM server 101 may store voicemail messages in a mailbox for unanswered calls a user's work phone, home VM server 102 may store voicemail messages in a mailbox for unanswered calls to a user's home phone, and wireless VM server 103 may store voicemail messages in a mailbox for unanswered calls to a user's mobile phone. Environment 100 may also include a mobile phone 104 and an aggregation server 105. Embodiments described herein may provide an aggregation system (e.g., aggregation server 105) that allows for the management of multiple mailboxes from a single communication device (e.g., mobile phone 104), without having to individually access the individual mailboxes. For example, a user may be able to manage, from mobile phone 104, voicemail messages in work VM server 101, home VM server 102, and wireless VM server 103.

FIGS. 1B, 1C, and 1D show exemplary visual voicemail (VVM) graphical user interfaces (GUIs) for a communication device, such a portable communication device (e.g., a mobile phone). FIG. 1B shows an exemplary pop-up screen for notifying a user that there are three new voicemail messages waiting in the user's voicemail box. FIG. 1B also shows that the user may select to ignore the voicemail messages (e.g., using a button 106) or listen to the voicemail messages (e.g., using a button 107). If the user selects to listen to the voicemail messages, the user may be presented with the GUI shown in FIG. 1C, for example.

FIG. 1C shows an exemplary list of voicemail messages including, for each voicemail, the name of the caller, the phone number of the caller, the time of the call, and the length of the voicemail message. In addition, the GUI of FIG. 1C may present an icon for each voicemail message indicating the mailbox in which the voicemail was left or deposited. For example, a building icon 108 may indicate that a message was left in the user's work mailbox; a house icon 110 may indicate that a message was left in the user's home mailbox; and a mobile-phone icon 112 may indicate that a message was left in the user's mobile-phone mailbox. In one embodiment, a communication device may allow for the management of multiple mailboxes, such as a work mailbox associated with building icon 108, a home mailbox associated with house icon 110, and/or a mobile-phone mailbox associated with mobile-phone icon 112.

The exemplary GUIs of the communication device may allow a user to manage the selected voicemail message. In the exemplary GUI of FIG. 1C, the user may scroll to and select any of the listed voicemail messages in any order. For example, a voicemail message 120 (in the user's mobile-phone mailbox) from Bob Sherman is highlighted for selection. The user may delete the selected voicemail message (e.g., using a button 114) or play the selected voicemail message (e.g., using a button 116). If the user selects to play the voicemail, the user may be presented with the GUI shown in FIG. 1D, for example.

FIG. 1D shows an exemplary voicemail message being played. As shown in FIG. 1D, the user may delete the selected message (e.g., using a button 122 or a key labeled "7" on a numeric keypad); may save the message (e.g., using a button 124 or a key labeled "9" on the numeric keypad); may initiate a call to the party that left the voicemail message (e.g., using a button 126 or a key labeled "5" on the numeric keypad); may rewind the message (e.g., using a button 128); may fast-forward the message (e.g., using a button 130); or may pause the message (e.g., using a button 132).

FIG. 2 shows an exemplary network 200 in which embodiments described herein may be implemented. As shown, network 200 may include a device layer 202, a voice-mail (VM) layer 204, and a VVM layer 206. VVM layer 206 may lie between device layer 202 and VM layer 204 and may facilitate the exchange of messages (e.g., communications) between device layer 202 and VM layer 204.

Device layer 202 may include, for example, a computer 208, a television (TV) 210, a smart phone 216 (e.g., a Blackberry, Treo, etc.), a PDA 218, a mobile phone 220, and/or another type of communication device. Any of devices 208-220 may be considered user devices. VM layer 204 may include VM servers 232-236 (e.g., a work VM server 232, a home VM server 234, and a wireless VM server 236), and a service-wide directory (SWD) server 238. VVM layer 206 may include a VVM server 252, a device proxy 254, an SMPP (Short Message Peer-to-Peer Protocol) gateway server 256, an authentication server 258, a notification server 260, and a VVM gateway server 262.

Computer 208 may include one or more computer systems for hosting programs, databases, and/or applications. Computer 208 may include a laptop, desktop, or any other type of computing device. Computer 208 may include a browser application program for navigating a network, such as the Internet.

TV 210 may include a device capable of receiving and reproducing video and audio signals, e.g., a video display device. TV 210 may include a liquid crystal display (LCD), a cathode ray tube (CRT), a plasma display, etc.

TV 210 may be associated with a set-top box (STB) (not shown). The STB may include a computer device, such as a cable card, for hosting programs, databases, and/or applications. In one embodiment, TV 210 may include the STB in the same housing. TV 210 and/or the STB may include a visual voicemail application to receive, listen to, and/or send voicemail messages. TV 210 and/or the STB may be associated with a remote control (not shown). The remote control may include control keys to navigate menus displayed on TV 210, for example, and to otherwise control functions of TV 210 and/or the STB. The remote control may transmit infrared signals, or another type of signals, to an input device associated with the STB and/or TV 210.

Smart phone 216, PDA 218, and/or mobile phone 220 may allow a user to place telephone calls to other user devices. Smart phone 216, PDA 218, and/or mobile phone 220 may communicate with other devices via one or more communication towers (not shown) using a wireless communication protocol, e.g., GSM (Global System for Mobile Communications), CDMA (Code-Division Multiple Access), WCDMA (Wideband CDMA), GPRS (General Packet Radio Service), EDGE (Enhanced Data Rates for GSM Evolution), etc. In one embodiment, smart phone 216, mobile phone 220, and/or PDA 218 may communicate with other devices through a wireless local network using WiFi (e.g., IEEE 802.11x).

In other embodiments, smart phone 216, PDA 218, and/or mobile phone 220 may also communicate with other devices via a wired network. For example, smart phone 216, mobile phone 220, and PDA 218 may communicate with other devices using a public-switched telephone network (PSTN) or the Ethernet protocol. Smart phone 216, PDA 218, and mobile phone 220 may include a visual voicemail application to receive, listen to, and/or send voicemail messages.

Work VM server 232, home VM server 234, and wireless VM server 236 may each receive and store voicemail messages in mailboxes associated with one or more user devices, such as user devices 208-220. Examples of VM servers include the Lucent Automatic Call Distributor (ACD) server and the Comverse Voicemail Service Node (VSN) server. VM servers 232-236 may receive voicemail messages when, for example, a user does not answer a call request. VM servers 232-236 may deliver the voicemail messages when requested, for example, to one of user devices 208-220 or VVM server 252. In one embodiment, VM servers 232-236 may store video voicemail, as well as audio voicemail.

In one exemplary embodiment, user devices 208-220 may be associated with a single user. For example, a user may have been issued smart phone 216 and computer 208 by an employer to be used for work. The same user may own mobile phone 220 for personal use and may have TV 210 at home for family use. The same user may also own PDA 218 that may be used as a personal address book as well as a home phone. In this exemplary embodiment, work VM server 232 may receive and store voicemail for smart phone 216; home VM server 234 may receive and store voicemail for PDA 218; and wireless VM server 236 may receive and store voicemail for mobile phone 220. Although user devices 208-220 may be associated with one user in this example, VM servers 232-236 may store voicemails for more than one user (e.g., thousands or hundreds of thousands of users).

VM servers 232-236 may notify VVM server 252 of new voicemail messages by sending messages (e.g., SMPP messages) to VVM server 252 through notification server 260. VM servers 232-236 may also provide voicemail message information (e.g., voicemail message headers) to VVM server 252 by sending messages (e.g., IMAP (Internet Message Mapping Protocol) messages) to VVM server 252 through VVM gateway 262. VM servers 232-236 may also send voicemail message audio files to devices 208-220 through VVM gateway 262, VVM server 252 and/or device proxy 254, for example.

SWD server 238 may include a database of device numbers (e.g., phone numbers, mobile device numbers, Universal Resource Indicators (URIs), or Universal Resource Locaters (URLs)) and corresponding mailbox identifiers (mailbox IDs) associated with each of the device numbers. A mailbox ID may identify the mailbox used for storing voicemail messages for a corresponding device number. A mailbox ID may also identify the VM server (e.g., one of VM servers 232-236) with which the mailbox is associated. SWD 238 may also store information for associating multiple user devices, device numbers, or mailbox IDs with a single user, such as associating user devices 208-220 with the same user.

VVM server 252 may include one or more computer systems for hosting programs, databases, and/or applications. VVM server 252 may run a web server application, such as Apache, to serve web pages when requested. For example, VVM server 252 may allow a user to access voicemail message over a data network, for example, using computer 208. VVM server 252 may request voicemail messages and/or headers from one of VM servers 232-236 and may forward voicemail messages and/or headers to any one of devices 208-220 directly or through VVM gateway 262, device proxy 254, and/or SMPP gateway 256. In one embodiment, VVM server 252 may aggregate voicemail information from work VM server 232, home VM server 234, and/or wireless VM server 236. As such, VVM server 252 may provide the functionality described above with respect to aggregation server 105.

Notification server 260 may receive voicemail message notifications (e.g., SMPP messages) from VM servers 232-236. Notification server 260 may pass notifications of voicemail messages received from VM servers 232-236 to VVM server 252 (e.g., as HTTP messages).

VVM gateway 262 may receive information about voicemail messages (e.g., voicemail message headers) from VM servers 232-236. The information may include lists of voicemail messages that may include data conforming to, for example, the IMAP protocol. VVM gateway 262 may pass voicemail message headers received from VM servers 232-236 to VVM server 252. VVM gateway 262 may pass data to VVM server 252 in the form of XML (eXtensible Markup Language) data in HTTP messages, for example.

Device proxy 254 may receive communications from one or more user devices 210-220 for forwarding to other devices (e.g., VVM server 252 and/or SMPP gateway 256). Device proxy 254 may also authenticate user devices (e.g., user devices 210-220) by, for example, communicating with authentication server 258. Authentication server 258 may store information related to device authentication, such as session cookies. Device proxy 254 may communicate with devices (e.g., user devices 210-220) using secure channels implementing, for example, SSL (Secure Socket Layer) protocols or TLS (Transport Layer Security) protocols.

SMPP gateway 256 may receive SMPP (e.g., SMS (Short Message System)) messages from device proxy 254 and pass the received SMPP messages to user devices, such as user devices 216-220. SMPP gateway 256 may also receive SMPP messages from user devices 216-220, for example, and pass the received SMPP messages to device proxy 254.

In other embodiments, network 200 may include more, fewer, or different devices. Moreover, one or more devices 208-262 may perform one or more functions of any other device in network 200. Furthermore, one or more of devices 208-262 may be remotely located from each other, e.g., devices 208-262 may be geographically diverse. Although FIG. 2 shows devices 208-262 coupled to each other in a particular configuration, devices 208-262 may also be arranged in other configurations, either coupling directly with each other or through one or more networks, such that any one of devices 208-262 may communicate with any other one of devices 208-262. For example, any one of devices 208-262 may communicate with any other one of devices 208-262 through the Internet, an ad hoc network, a local area network (LAN), a wide area network (WAN), a metropolitan area network (MAN), a cellular network, a PSTN, a high-speed fiber optic network (e.g., FiOS™), or any other network or combinations of networks.

FIG. 3 is diagram of an exemplary user device 300, such as one or more of user devices 208-220. As illustrated, user device 300 may include a speaker 304, a display 306, control keys 308, a keypad 310, and a microphone 312. User device 300 may include other components (not shown in FIG. 3) that aid in receiving, transmitting, and/or processing data. Moreover, other configurations of user device 300 are possible.

Speaker 304 may provide audible information to a user of user device 300. Display 306 may include a display screen to provide visual information to the user, such as video images or pictures, and may include a touch-screen display to accept inputs from the user. For example, display 306 may provide information regarding incoming or outgoing telephone calls, telephone numbers, contact information, current time, voicemail, email, etc. Display 306 may display the GUIs shown in FIGS. 1B-1D, for example.

Control keys 308 may permit the user to interact with user device 300 to cause user device 300 to perform one or more operations, such as interacting with a visual voicemail application. Control keys 308 may include soft keys that may perform the functions indicated on display 306 directly above the keys. Keypad 310 may include a standard telephone keypad and may include additional keys to enable inputting (e.g., typing) information into user device 300. Microphone 312 may receive audible information from the user.

FIG. 4 is a block diagram of exemplary components of a client computing module 400. User devices 208-220 may each include one or more computing modules 400. Client computing module 400 may include a bus 410, processing logic 420, an input device 430, an output device 440, a communication interface 450, and a memory 460. Client computing module 400 may include other components (not shown) that aid in receiving, transmitting, and/or processing data. Moreover, other configurations of components in client computing module 400 are possible.

Bus 410 may include a path that permits communication among the components of client computing module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into client computing module 400, such as a keyboard (e.g., control keys 308 and/or keypad 310), a mouse, a pen, a microphone (e.g., microphone 312), a remote control, a touch-screen display (e.g., display 306), etc. Output device 440 may include a device that outputs information to the user, such as a display (e.g., display 306), a printer, a speaker (e.g., speaker 304), etc. Output device 440 may also include a vibrator to alert a user.

Input device 430 and output device 440 may allow the user to activate a particular service or application, such as a visual voicemail application and/or service. Input device 430 and output device 440 may allow the user to receive and view a menu of options and select from the menu options. The menu may allow the user to select various functions or services associated with applications executed by client computing module 400.

Communication interface 450 may include any transceiver-like mechanism that enables client computing module 400 to communicate with other devices and/or systems. Communication interface 450 may include a transmitter that may convert baseband signals to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals. Communications interface 450 may include a network interface card, e.g., Ethernet card, for wired communications or a wireless network interface (e.g., a WiFi) card for wireless communications. Communication interface 450 may also include, for example, a universal serial bus (USB) port for communications over a cable, a Bluetooth™ wireless interface for communicating with Bluetooth devices, a near-field communication (NFC) interface, etc. Communication interface 450 may implement a wireless communication protocol, e.g., GSM, CDMA, WCDMA, GPRS, EDGE, etc.

Communications interface 450 may also receive, transmit and/or process digital or analog audio inputs/outputs and/or digital or analog video inputs/outputs.

Memory 460 may include a random access memory (RAM) or another type of dynamic storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions.

Memory 460 may include a VVM application 462, a voicemail message table 464 (e.g., database), and voicemail audio files 466. VVM application 462 may allow a user to receive, select, listen to, and act on (e.g., save, forward, delete) voicemail messages. Message table 464 may store a list of voicemail messages including information such as the date and time of a voicemail message, the duration of the message, the status of the message, etc. Voicemail audio files 466 may include the audio data of the voicemails (e.g., in any format, including MP3, WMA (Windows Media Audio), AAC (Advanced Audio Coding), QCP (Qualcomm Code Prediction and/or Qualcomm Code Excited Linear Prediction), Ogg Vorbis, etc.).

Client computing module 400 may perform certain operations, as described below. Client computing module 400 may perform these operations in response to processing logic 420 executing software instructions contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described below.

Figure 5:
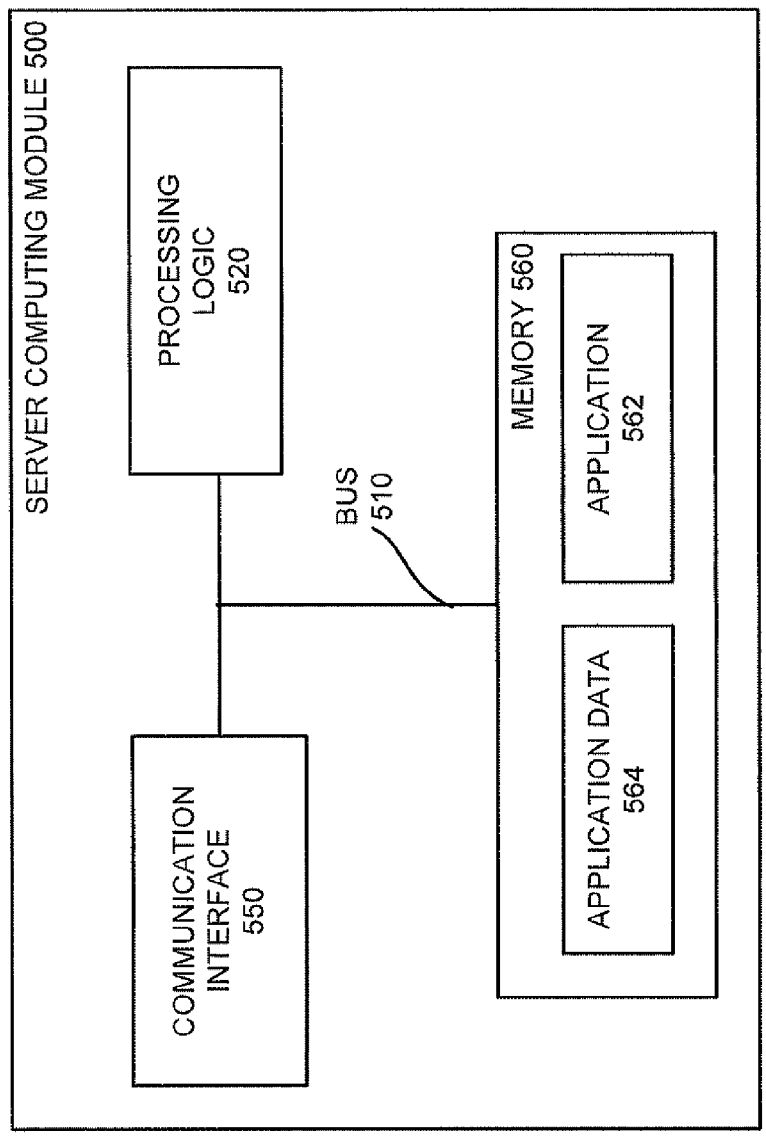
FIG. 5 is a block diagram of exemplary components of a server computing module.

FIG. 5 is a block diagram of exemplary components of a server computing module 500. Devices 232-262 may include one or more server computing modules (e.g., a rack of server computer modules), such as computing module 500. Server computing module 500 may include a bus 510, processing logic 520, a communication interface 550, and a memory 560. Server computing module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to RF signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a wireless network interface (e.g., a WiFi card) for wireless communications. Communication interface 550 may also include, for example, a USB port for communications over a cable, a Bluetooth wireless interface for communicating with Bluetooth devices, a NFC interface, etc. Communication interface 550 may implement a wireless communication protocol, e.g., GSM, CDMA, WCDMA, GPRS, EDGE, etc. Communications interface 550 may receive, transmit and/or process digital or analog audio inputs/outputs and/or digital or analog video inputs/outputs.

Memory 560 may include a RAM or another type of dynamic storage device that may store information and instructions, e.g., an application 562 and application data 564, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions.

In the case of VM servers 232-236, for example, application 562 may include an application to receive voicemail messages on behalf of user devices, such as user devices 216-220, when the users of the devices do not answer call requests, for example. Application data 564 may include voicemail message tables and corresponding audio data.

In the case of VVM server 252, for example, application 562 may include an application to receive voicemail message information and corresponding voicemail audio data from VM servers 232-236 and deliver the received voicemail message information and corresponding voicemail audio data to user devices. As such, in the case of VVM server 252, application data 564 may also include voicemail message tables and corresponding audio files.

Module 500 may perform certain operations, as described in detail below. Module 500 may perform these operations in response to processing logic 520 executing software instructions contained in a computer-readable medium, such as memory 560. The software instructions may be read into memory 560 from another computer-readable medium or from another device via communication interface 550. The software instructions contained in memory 560 may cause processing logic 520 to perform processes that are described below.

FIG. 6A is a diagram of exemplary message tables 600-1, 600-2, and 600-3, e.g., databases (collectively "message tables 600"). Message tables 600 may each store information related to voicemail messages. Each entry (e.g., record) in message tables 600 may include information regarding a different voicemail message.

Message tables 600 may be stored in one or more of VM servers 232-236 (e.g., in memory 560). In one exemplary embodiment, message table 600-1 may store information regarding messages associated with smart phone 216; message table 600-2 may store information regarding messages associated with PDA 218; and message table 600-3 may store information regarding messages associated with mobile phone 220. In this exemplary embodiment, message table 600-1 may be stored in work VM server 232; message table 600-2 may be stored in home VM server 234; and message table 600-3 may be stored in wireless VM server 236. In other embodiments, message tables 600 may also be stored in another device in network 200, such as in VVM server 252 (e.g., in memory 560) or another of devices 208-220 (e.g., in memory 460 as message table 464).

Message tables 600 may include a mailbox identifier ("mailbox ID" or "MBID") field 602, a message identifier ("message ID" or "MID") field 604, a called device number (DN) field 605, a caller DN field 606, a state field 610, and a location field 612.

Mailbox ID field 602 may include a value identifying a mailbox in one of VM servers 232-236. In exemplary message tables 600, there are three mailboxes identified in mailbox ID field 602: MBA1, MBB1, and MBC1. In this example, MBA1 may be a mailbox in work VM server 232 associated with smart phone 216, MBB1 may be a mailbox in home VM server 234 associated with PDA 218 and, and MBC1 may be a mailbox in wireless VM server 236 associated with mobile phone 220.

Message ID field 604 may include a value that may uniquely identify a voicemail message in a mailbox. For example, record 652 in message table 600-1 stores a message identifier of A124 in message ID field 604.

Called DN field 605 may include a device number (e.g., phone number, mobile device number, URI, or URL) of the user device for which the corresponding voicemail message is intended. In exemplary message tables 600, there are three device numbers in called DN field 605: 2022513434, 7035678989, and 2023459292. In this example, the device number 2022513434 may be associated with mobile phone 220; the device number 2023459292 may be associated with PDA 218; and the device number 7035678989 may be associated with smart phone 216. In one embodiment, there may be a one-to-one relationship between a called DN and a mailbox ID, such that each called DN is associated with one mailbox ID and vice versa.

Caller DN field 606 may include a device number (e.g., phone number, mobile device number, URI, or URL) of the user device associated with the depositing of the corresponding voicemail message. In exemplary message tables 600, the messages identified in records 652-656 were deposited by various different device numbers as indicated in field 606.

State field 610 may include one or more tags identifying the state (e.g., status) of the corresponding voicemail message. Tags in state field 610 may include NEW, HEARD, SAVED, and DELETED. The NEW tag may indicate a voicemail message that has not been listened to yet by the user. The HEARD tag may indicate a voicemail message that has been listened to by the user. The SAVED tag may indicate a voicemail message that the user requested be saved in one of user devices 208-220 and/or one of VM servers 232-236 for a number of days, e.g., 21 days. The DELETED tag may indicate a voicemail message that has been marked for deletion by a user device. Other tags in state field 610 are possible, such as BUSINESS to identify business voicemail message, PERSONAL to identify personal voicemail message, FAMILY to identify voicemail message from family members, URGENT to identify urgent messages, and NOT URGENT to identify non-urgent messages.

Location field 612 may indicate the location (e.g., filename and/or pathname, URL, or URI) of an audio file associated with the corresponding voicemail message. In one embodiment, the audio file may be stored locally and location field 612 may include the filename of the local file associated with the corresponding voicemail message. In another embodiment, the audio file may be stored remotely and location field 612 may include the remote location of the audio file associated with the corresponding voicemail message.

Message tables 600 may include additional, different, or fewer fields than illustrated in FIG. 6A. For example, message tables 600 may include a call time field that may include the date and time that the corresponding voicemail message was left in one of VM servers 232-236. As another example, message tables 600 may include a priority field that may specify the urgency (e.g., 1-10) of the corresponding voicemail message.

FIG. 6B is a block diagram of exemplary message tables 600-1', 600-2', and 600-3' (collectively message tables 600'). Message tables 600-1', 600-2', and 600-3' may represent message tables 600-1, 600-2, and 600-3, respectively, but at a different point in time. Message tables 600' may be referred to as "updated message tables 600'." Like exemplary message tables 600, exemplary message tables 600' include records 652, 654, and 656. Unlike message tables 600, however, message tables 600' include records 658, 660, and 662. In particular, message table 600-1' includes record 662 that does not appear in message table 600-1; message table 600-2' includes record 658 that does not appear in message table 600-2; and message table 600-3' includes record 660 that does not appear in message table 600-3. As shown in exemplary message tables 600', records 658, 660, and 662 each include a state of NEW in state field 610.

The data in message tables 600 and 600' are for exemplary purposes only. As shown, for example, message tables 600-1 and 600-1' store information for only one mailbox ID and one called DN (e.g., mailbox ID of MBA1 and called DN of 7035678989). Message tables 600-1 and 600-1' (and the other message tables) may store information for more than one mailbox ID and called DN, however. In addition, message tables 600 and 600' may store thousands or hundreds of thousands of records.

FIG. 7A is a block diagram of an exemplary aggregate message table 700, e.g., a database. Aggregate message table 700 may store information from one or more other message tables, such as message tables 600. Aggregate message table 700 may be stored in one or more of devices 208-220 (e.g., in memory 460 as message table 464). Aggregate message table 700 may also be stored in VVM server 252 (e.g., in memory 560) or another device in network 200.

Like message tables 600, each entry in aggregate message table 700 may include information regarding a different voicemail message. Further, aggregate message table 700 may include the same or similar fields as message tables 600. That is, aggregate message table 700 may include a mailbox ID field 702, a message ID field 704, a called DN field 705, a caller DN field 706, a state field 710, and a location field 712. Aggregate message table 700 may include additional, different, or fewer fields than illustrated in FIG. 7. These fields shown in FIG. 7 may store the same or similar information as descried above for fields 602-612 in FIG. 6A of message tables 600 or 600'.

Exemplary aggregate message table 700 may include records 752, 754, and 756, which may store the same information as records 652, 654, and 656, respectively, in message tables 600. Thus, aggregate message table 700 may be considered an "aggregate" table because it aggregates message information from a group of disparate message tables corresponding to different mailboxes, in this case message tables 600. In an alternative embodiment, message table 700 may store data from only one other message table.

FIG. 7B is a block diagram of an exemplary aggregate message table 700', which may represent aggregate message table 700 at a different point in time. Aggregate message table 700' includes records 752, 754, and 756 that also appear in aggregate message table 700. Aggregate message table 700' also includes records 758, 760, and 762 that do not appear in aggregate message table 700. Exemplary aggregate message table 700' may include records 758, 760, and 762, which may store the same information as records 658, 660, and 662, respectively, in message tables 600'. As shown, records 758, 760, and 762 each include a state of NEW in state field 710.

The data in aggregate message tables 700 and 700' are for exemplary purposes. Aggregate message tables 700 and 700' as shown, for example, store information for voicemail messages associated with a single user, e.g., the user related to smart phone 216, PDA 218, and mobile phone 220. Aggregate message tables 700 and 700' may store information associated with thousands even hundreds of thousands of users. In addition, aggregate message tables 700 and 700' may store thousands or hundreds of thousands of messages, for example.

Figure 8A:
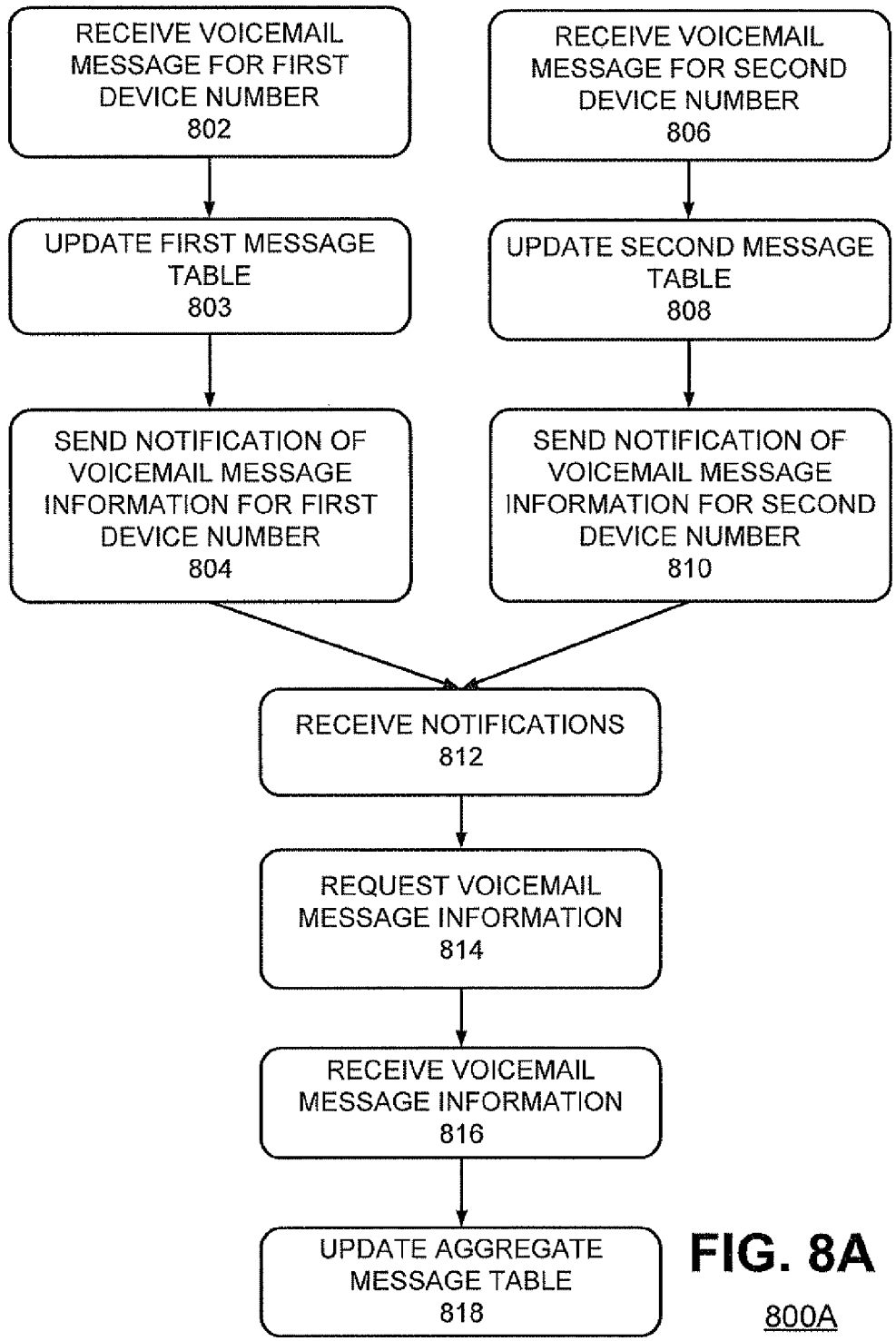
FIGS. 8A and 8B are flowcharts of exemplary processes for receiving a voicemail and notifying a user device of voicemail information.

FIG. 8A is a flowchart of an exemplary process 800A for receiving a voicemail message and for notifying a VVM server of voicemail information. FIG. 8A is described with respect to FIG. 9, which is a diagram of exemplary network signals for notifying a user device of voicemail information. For the purposes of FIG. 9, device proxy 254, SMPP gateway 256, notification server 260, and VVM gateway 262 have been omitted for simplicity. All or parts of process 800A may run in work VM server 232, home server 234, wireless VM server 236, VVM server 252, and/or any of user devices 208-220.

Process 800A may begin when a voicemail message, associated with a first device number, is received (block 802). For example, mobile phone 220 (e.g., device number 2022513434) may receive a call request from another device (e.g., device number 4569812124). Mobile phone 220, however, may not accept (e.g., not answer) the call request, which may cause the call request to be directed to wireless VM server 236, and wireless VM server 236 may receive a voicemail. A first message table may be updated (block 803). For example, wireless VM server 236 may associate the received voicemail message with a message ID (e.g., a message ID of C130), the called DN (e.g., 2022513434), and the caller DN (e.g., 4569812124) and wireless VM server 236 may store this information in its message table. In this example, wireless VM server 236 may update message table 600-3 to include record 660, for example, as shown in message table 600-3'. Wireless VM server 236 may also store the mailbox ID (e.g., MBC1), the state (e.g., NEW), and the filename of the audio data (e.g., MSG4.QCP) in record 660.

A notification of voicemail message information for the first device number may be sent (block 804). For example, having received a new voicemail (e.g., the voicemail message associated with record 660), wireless VM server 236 may send a notification (signal 902) to VVM server 252 of the new voicemail. The notification message (signal 902) may include the called DN, e.g., 2022513434 from field 605, and the mailbox ID, e.g., MBC1 from mailbox ID field 602. Wireless VM server 236 may send the notification (signal 902) to VVM server 252 through notification server 260 (shown in FIG. 2), for example. In one embodiment, the notification message (signal 902) may include an SMPP message. In one embodiment, the change of the message table in the VM server (e.g., the addition of record 660 to message table 600-3' in wireless VM server 236) may prompt the sending of the notification message (signal 902). In this example, the notification of voicemail message information may be the result of a new voicemail message. Notifications may also be sent for other reasons, such as a state change in state field 610 of a voicemail message. In another embodiment, notification messages, such as signal 902, may additionally or alternatively be sent on a periodic basis.

Voicemail messages may be received by other VM servers (e.g., other than wireless VM server 236) for other device numbers (e.g., other than device number 2022513434). In other words, a voicemail message, associated with a second device number, may be received and stored (block 806). For example, smart phone 216 (e.g., device number 7035678989) may receive a call request from another device (e.g., device number 2039574986). Smart phone 216, however, may not accept (e.g., not answer) the call request, which may cause the call request to be directed to work VM server 232, and work VM server 232 may receive a voicemail. A second message table may be updated (block 808). For example, work VM server 232 may associate the received voicemail message with a message ID (e.g., a message ID of A125), the called DN (e.g., 7035678989), and the caller DN (e.g., 2039574986) and work VM server 232 may store this information in its message table. In this example, wireless VM server 236 may update message table 600-1 to include record 662, for example, as shown in message table 600-1'. Work VM server 232 may also store the mailbox ID (e.g., MBA1), the state (e.g., NEW), and the filename of the audio data (e.g., MSG9.QCP) in record 662.

A notification of voicemail message information for the second device number may be sent (block 810). For example, having received a new voicemail (e.g., the voicemail message associated with record 662), work VM server 232 may send a notification (signal 904) to VVM server 252 of the new voicemail. The notification message (signal 904) may include the called DN, e.g., 7035678989 from field 605, and the mailbox ID, e.g., MBA1 from mailbox ID field 602. Work VM server 232 may send the notification to VVM server 252 through notification server 260 (shown in FIG. 2), for example. In one embodiment, the notification message may include an SMPP message.

The notifications of voicemail message information may be received (block 812). For example, VVM server 252 may receive the notification (signal 902) of voicemail message information for the first device number (e.g., 2022513434) from wireless VM server 236. VVM server 252 may also receive the notification (signal 904) of voicemail message information for the second device (e.g., 7035678989) number from work VM server 232.

Voicemail message information may be requested (block 814). In response to signal 902 received from wireless VM server 236, VVM server 252 may send a request (signal 906) to wireless VM server 236 for information regarding the voicemail messages stored by wireless VM server 236. VVM server 252 may send the request (signal 906) to wireless VM server 236 through VVM gateway 262 (shown in FIG. 2), for example. The request (signal 906) may include the called DN (e.g., of mobile phone 220 received earlier in signal 902), the mailbox ID (e.g., MBC1 received earlier in signal 902), and a personal identification number (PIN) associated with the mailbox ID. In one embodiment, if VVM server 252 does not store the PIN associated with the mailbox ID, then VVM server 252 may request the PIN from mobile phone 220. In addition, VVM server 252 may send a request (signal 908) to work VM server 232 for information regarding the voicemail messages stored by work VM server 232. The request may include the called DN (e.g., of smart phone 216), the mailbox ID (e.g., MBA1), and a personal identification number (PIN) associated with the mailbox ID.

Information regarding voicemail messages may be received (block 816). VVM server 252 may receive voicemail message information (signal 910) from wireless VM server 236. Wireless VM server 236 may send voicemail message information (signal 910) in response to receiving the request (signal 906) for information regarding voicemail messages. Wireless VM server 236 may send the information (signal 910) to VVM server 252 through VVM gateway 262 (shown in FIG. 2), for example. The voicemail message information (signal 910) may include a list of voicemail messages. In one embodiment, the information may include XML formatted data including message IDs and the corresponding state (e.g., the information stored in state field 610).

In the this example where mobile phone 220 receives a voicemail message, the information in signal 910 may include the message IDs of C129 and C130 from message ID field 604 for mailbox MBC1 as shown in message table 600-3'. The information in signal 910 may also include the states associated with the two messages, e.g., NEW for the voicemail message associated with message ID C130 (record 660) and HEARD for the voicemail message associated with message ID C129 (record 654). In one embodiment, signal 910 may include information related to only the records that prompted notification signal 902 in the first place, e.g., the records that are new or have changed information.

In addition, VVM server 252 may receive voicemail message information (signal 912) from work VM server 232. The voicemail message information may include a list of voicemail messages that may include message IDs and the corresponding state. In the example where smart phone 218 receives a voicemail message, the voicemail message information (signal 912) may include the message IDs of A124 and A125 from message ID field 604 of the message table stored in work VM server 232, e.g., message table 600-1'. The voicemail message information (signal 912) may also include the states associated with the two messages, e.g., NEW for the voicemail message associated with message ID A125 (record 662) and HEARD for the voicemail message associated with message ID A124 (record 652).

VVM server 252 may update an aggregate message table (block 818). For example, before receiving the information (signal 910) regarding voicemail messages, VVM server 252 may store an aggregate message table (similar to aggregate message table 700) which does not include a record corresponding to the information in record 660 of message table 600-3' of FIG. 6B. After receiving the information (signal 910) regarding voicemail messages, VVM server 252 may update its aggregate message table to include the information in record 760 as shown in aggregate message table 700', which corresponds to record 660 of message table 600-3', e.g., the information of which was received in signal 906.

In addition, before receiving the information regarding voicemail messages (signal 912) from work VM server 232, VVM server 252 may store an aggregate message table (similar to aggregate message table 700) which does not include a record corresponding to the information in record 662 of message table 600-1' of FIG. 6B. After receiving the information regarding voicemail messages (signal 912) from work VM server 232, VVM server 252 may update its aggregate message table to include the information in record 762 as shown in aggregate message table 700', which corresponds to record 662 of message table 600-1'.

As described above, wireless VM server 236 and work VM server 232 may each receive voicemail messages at approximately the same time and may each send notifications to VVM server 252 at approximately the same time. VVM server 252, then, may request information from the VM servers 232 and 236 at approximately the same time and update its aggregate message table (e.g., aggregate message table 700). Wireless VM server 236 and work VM server 232, however, may each receive the respective voicemail messages at significantly different times. In this case, wireless VM server 236 may notify VVM server 252 at a significantly different time than work VM server 232 may notify VVM server. Likewise, in this case, VVM server 252 may update its aggregate message table with information from each VM server at different times.

In another embodiment, VVM server 252 may request voicemail message information (e.g., by sending signal 906) on a periodic basis in addition to or alternatively to waiting for a notification (e.g., signal 902). In this embodiment, VVM server 252 may periodically request voicemail message information from each VM server, such as VM servers 232-236.

As described, blocks 802 through 804 may be implemented in wireless VM server 236 and blocks 806 through 810 may be implemented in work VM server 232. Any number of other VM servers may implement blocks similar or identical to blocks 802 through 804. For example, home VM server 234 may also receive a voicemail message (similar to block 802) for an unanswered call to PDA 218. Information regarding this voicemail may be stored (similar to block 803) as record 658 in message table 600-2'. Home VM server 234 may send a notification signal (similar to signal 902) to VVM server 252 (block 804). VVM server 252 may request (block 814) and may receive (block 816) voicemail information from home VM server 234. VVM server 252 may update its aggregate voicemail message table to include the information in record 758 as shown in aggregate message table 700'.

As shown, in response to a voicemail message left in each of VM servers 232-236, aggregate message table stored in VVM server 252 may be updated from the condition shown in exemplary message table 700 to that shown in shown in aggregate message table 700'. The aggregate message table stored in VVM server 252 may then reflect the current state of messages from the many VM servers, such as work VM server 232, home VM server 234, and wireless VM server 236.

Figure 8B:
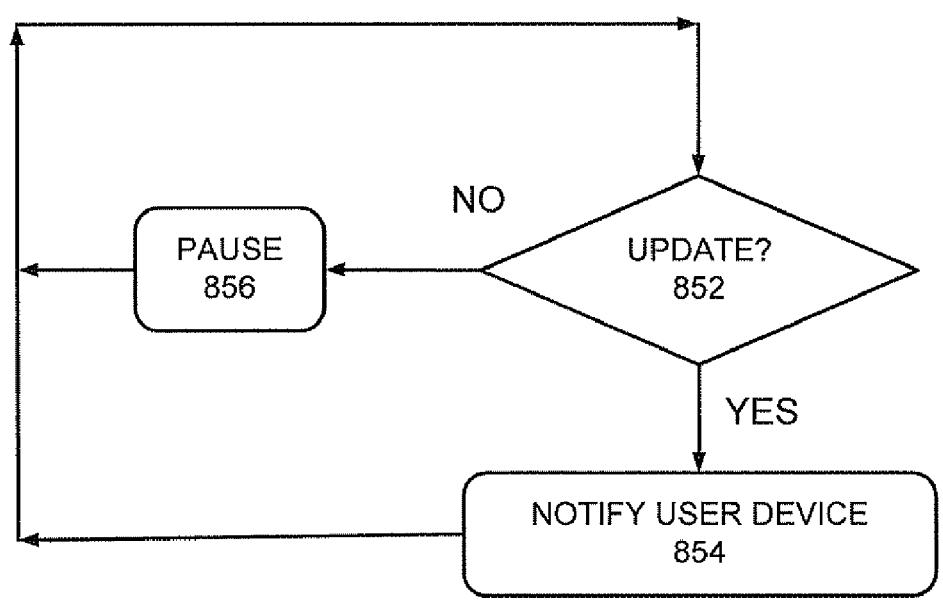

After receiving information from VM servers (in process 800A), VVM server 252 may decide to notify a user device. FIG. 8B is a flowchart of an exemplary process 800B for notifying a user device of voicemail message information. Process 800B may begin when VVM server 252 updates its aggregate message table (e.g., in process 800A), such as aggregate message table 700. If the aggregate message table has been updated (block 852: YES), then a user device may be notified (block 854). In one embodiment, a single user device may be notified regarding more than one mailbox ID.

Figure 9:
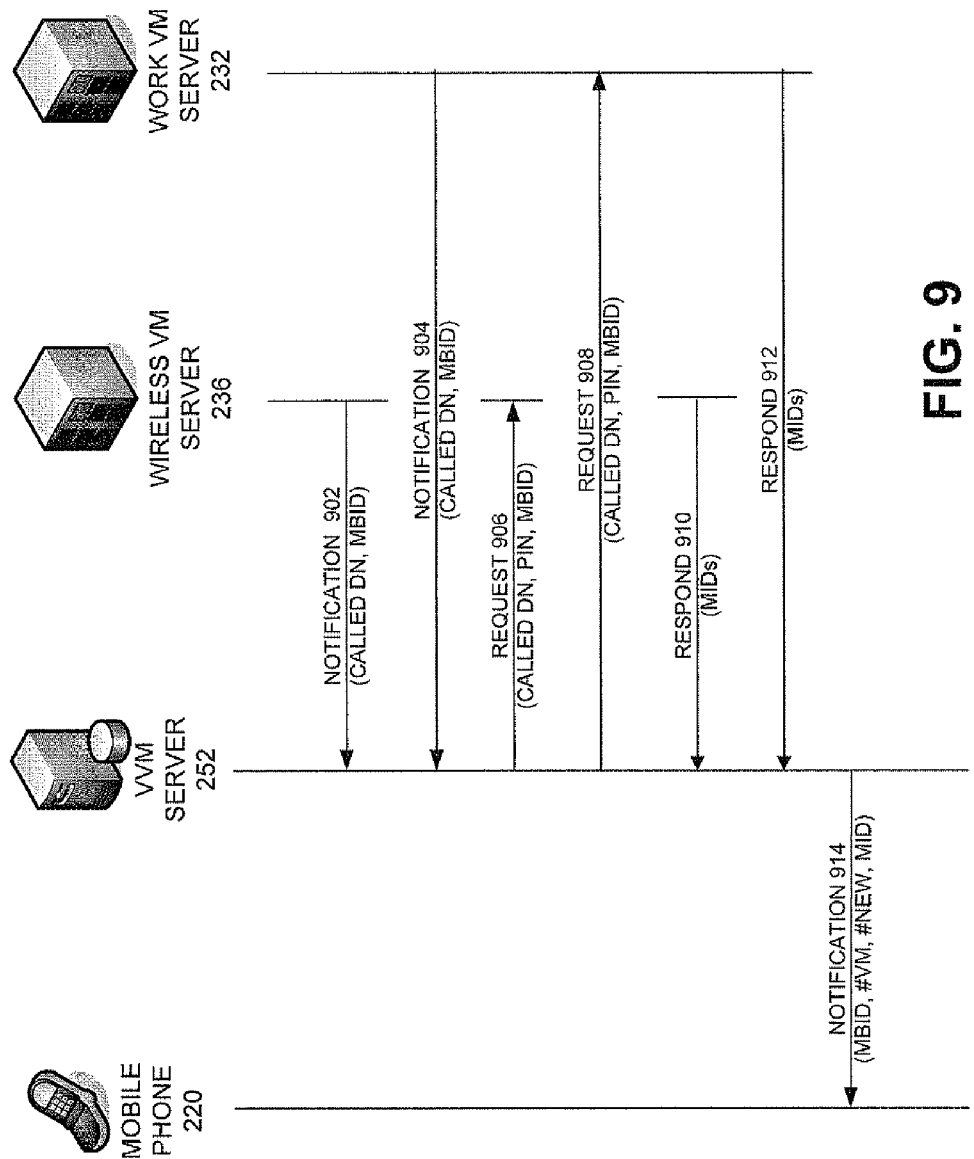
FIG. 9 is a diagram of exemplary network signals for notifying a user device of voicemail information.

For example, VVM server 252 may update its aggregate message table from the condition shown in aggregate message table 700 to the condition shown in message table 700' (e.g., including the information in one or more of records 758, 760, and/or 762). Any one of these updates may prompt VVM server 252 to send a notification to one or more of devices 208-220. As shown in FIG. 9, VVM server 252 may send a notification message (signal 914) to mobile phone 220, for example, through device proxy 254 and/or SMPP gateway 256. The notification message (signal 914) to mobile phone 220 may include information regarding record 758 (e.g., mailbox ID of MBB1), record 760 (e.g., mailbox ID of MBC1), and/or record 762 (e.g., mailbox ID of MBA1). VVM server 252 may query SWD server 238 to determine which user devices (e.g., device numbers) may receive notification regarding a particular mailbox ID, for example.

In one embodiment, the notification (signal 914) may include, for a particular mailbox ID, the number of voicemail messages (#VM), the number of new messages (#NEW), and the message ID of the most recent new voicemail message. The notification (signal 914) may also include the mailbox ID to which the notification signal corresponds (e.g., the mailbox ID associated with the change in the aggregate message table that may have resulted in the notification message). In one embodiment, the notification (signal 914) may also include the message IDs of all the voicemail messages currently in the mailbox.

In one embodiment, the notification (signal 914) may include notifications for a group of mailbox IDs. In this embodiment, the notification (signal 914) may include, for a group of mailbox IDs, the number of voicemail messages (#VM) for each mailbox ID, the number of new messages (#NEW) for each mailbox ID, and the message ID of the most recent new voicemail message for each mailbox ID. In this embodiment, the notification (signal 914) may also include the mailbox ID(s) to which the notification signal corresponds. In one embodiment, the notification message (signal 914) may include a group of notification signals (e.g., one message/signal for each mailbox ID). In one embodiment, the notification (signal 914) may include the number of voicemail messages for a group of mailbox IDs, the number of number of new messages for each mailbox ID, and the message ID of the most recent new voicemail message for each mailbox ID.

In one embodiment, the notification (signal 914) may include an SMS message. In this embodiment, the SMS message (signal 914) may include a BREW (Binary Run Time Environment for Wireless) application message in an SMS message. In another embodiment, the SMS message (signal 914) may include a MWI (Mail Waiting Indicator) message.

If there has been no update to the aggregate message table (block 852: NO), then process 800B may pause (block 856) and may return to block 852.

Figure 10:
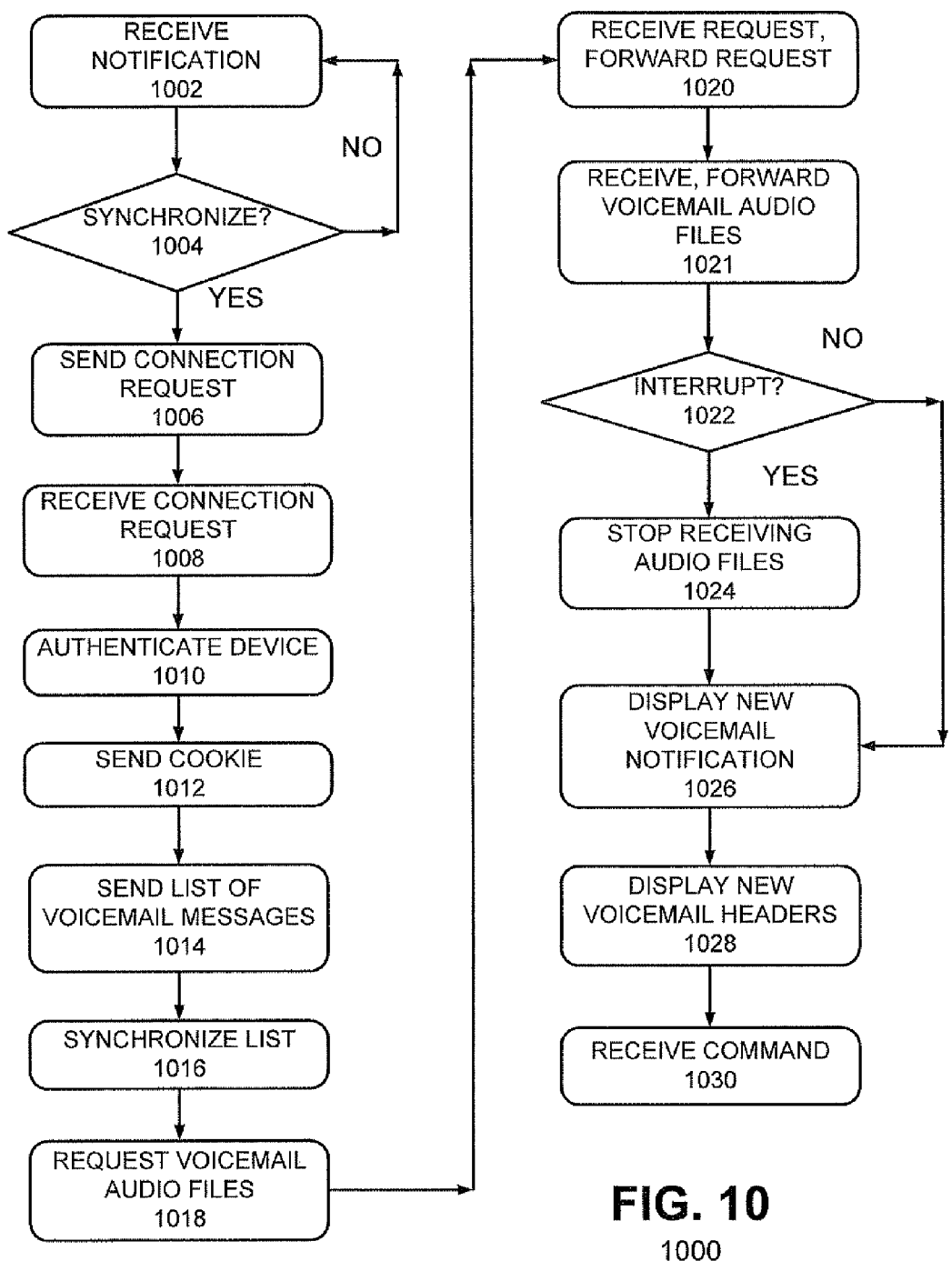
FIG. 10 is a flowchart of a process for synchronizing voicemail message information.
Figure 11:
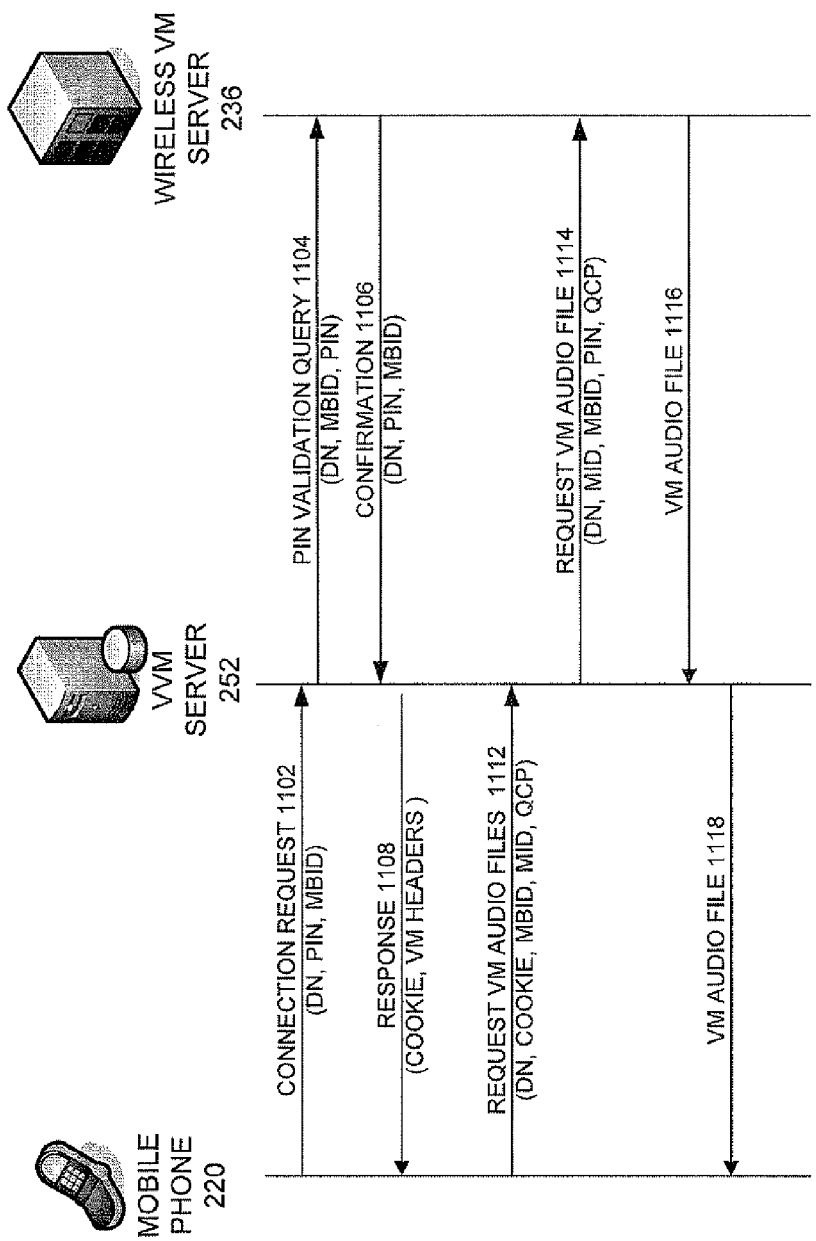
FIG. 11 is a diagram of exemplary network signals for synchronizing voicemail message information.

After receiving notification of voicemail messages, a user device may determine to download some or all of the voicemail message information identified in the notification (e.g., signal 914). FIG. 10 is a flowchart of a process 1000 for receiving voicemail message information. All or parts of process 1000 may be performed by a user device, such as one of user devices 208-220, VVM server 252, or any device in network 200. Process 1000 is described with respect to FIG. 11, which is a diagram of exemplary network signals passed in network 200 for receiving a voicemail message and/or authenticating a user device. For the purposes of FIG. 11, device proxy 254, SMPP gateway 256, notification server 260, and VVM gateway 262 have been omitted for simplicity.

Process 1000 may start when a user device receives a notification message, e.g., signal 914 (block 1002). In one embodiment, the notification (signal 914) may trigger the launching of VVM application 462. For example, the notification (signal 914) may trigger the user device to perform process 1000.

A determination of whether to synchronize may be made (block 1004). For example, mobile phone 220 may receive the notification message (signal 914) and may compare the information in the notification message (signal 914) with information already stored in mobile phone 220. Mobile phone 220 may determine that it does not have the most recent voicemail message information (block 1004: YES) and may initiate a synchronization with VVM server 252 to receive the most recent voicemail information.

If the notification message (signal 914), for example, includes a most recent message ID of which mobile phone 220 is unaware, then mobile phone 220 may decide to synchronize (block 1004: YES). If the notification message (signal 914) indicates that the number of unheard messages is different than the information stored in mobile phone 220, then mobile phone 220 may decide to synchronize (block 1004: YES). If the notification message (signal 914) indicates that the total number of messages is different than the information stored in mobile phone 220, then mobile phone 220 may decide to synchronize (block 1004: YES). In one embodiment, mobile phone 220 may display the number of unheard (e.g., new) voicemail messages and the total number of voicemail messages to the user of mobile phone 220.

Mobile phone 220, for example, may include an aggregate message table in the condition shown in aggregate message table 700, whereas VVM server 252 may include an aggregate message table in the condition shown in aggregate message table 700'. The notification message (signal 914) sent from VVM server 252 to mobile phone 220 may include information regarding messages in table 700'. For example, the notification (signal 914) may include the total number of voicemail messages for a mailbox (e.g., 2 for mailbox ID of MBC1), the number of new voicemail messages (e.g., 1 for mailbox ID of MBC1), and the most recent message IDs and corresponding mailbox ID (e.g., C130 for mailbox ID of MBC1). The notification (signal 914) may include similar information for other mailboxes, such as mailbox IDs MBA1 or MBB1.

Mobile phone 220 may determine that synchronization should be performed because, comparing the received information (signal 914) to the information in its aggregate message table (in the state shown in table 700), mobile phone 220 may have incomplete information. For example, the aggregate message table in mobile phone 220 would suggest the number of voicemail messages for the mailbox ID of MBC1 would be 1 (not 2) and there are no new voicemail messages (rather than 1).

If the user device does not synchronize (block 1004: NO), then process 1000 may return to block 1002. If the user device decides to synchronize (block 1004: YES), then a login or connection request may be sent (block 1006). For example, mobile phone 220 may send a connection request (signal 1102) to VVM server 252 and/or device proxy 254. The connection request may be received (block 1008). For example, the connection request (signal 1102) sent by mobile phone 220 may be received by VVM server 252 and/or device proxy 254. In one embodiment, the connection request (signal 1102) may include a request for voicemail message headers (e.g., a list of voicemail messages) for one or more mailbox IDs. The request for a connection (signal 1102) may include the device number, the mailbox ID, and/or a PIN for mobile phone 220. In one embodiment, the request for connection (signal 1102) may include the one or more mailbox IDs for which voicemail message headers are requested. In one embodiment, the user of mobile phone 220 may be prompted for the PIN and/or the PIN may be stored in mobile phone 220 and automatically provided.

The user device may be authenticated (block 1010). To authenticate the user device, such as mobile phone 220, VVM server 252 and/or device proxy 254 may send a PIN validation query (signal 1104) to wireless VM server 236. The PIN validation query (signal 1104) may include the PIN and mailbox ID received from the user device, e.g., mobile phone 220, in the login request (signal 1102). Wireless VM server 236 may determine whether the PIN validation message (signal 1104) includes the correct PIN for the device number and mailbox combination. If the PIN validation message (signal 1104) includes the correct PIN, then a confirmation message (signal 1106) may indicate a successful user validation. If the PIN validation message (signal 1104) does not include the correct PIN, then confirmation message (signal 1106) may indicate a failed user validation (e.g., failed authentication). If successful, VVM server 252 and/or device proxy 254 may store the PIN, the mailbox ID, and the device number for subsequent communications with VM servers 232-236.

A cookie may be sent (block 1012). After successful authentication, VVM server 252 and/or device proxy 254 may respond to mobile phone 220 with a login response message (signal 1108). The login response message (signal 1108) may include a session cookie. In one embodiment, the session cookie may include an expiration time or be associated with an expiration time. For example, the session cookie may expire after fifteen minutes, one half of an hour, an hour, etc. In one embodiment, authentication server 258 may provide VVM server 252 and/or device proxy 254 with the session cookie for forwarding to mobile phone 220. In one embodiment, the session cookie may be used by mobile phone 220 in future communications to authenticate mobile phone 220. In one embodiment, VVM server 252 and/or device proxy 254 may communicate with authentication server 258 to validate any cookies received from mobile phone 220.

In one embodiment, if the user device, such as mobile phone 220, does not receive a response (signal 1108), then the user device may be in an environment where data transfers are not possible. In this situation, the user device may implement the traditional user interface (TUI) for receiving voicemail message, such as requiring the user to call one of VM servers 232-236. In this situation, the user may use the user device to call one of VM servers 232-236 directly through the TUI.

A list of voicemail messages may be sent (block 1014). For example, VVM server 252 may send a list of voicemail message headers (signal 1108). In one embodiment, the voicemail headers may include message IDs, mailbox IDs, caller device numbers, and the states of the messages (e.g., information stored in a message table). The voicemail headers may include information regarding the one or more mailbox IDs specified in the request for connection (signal 1102). The voicemail message headers (signal 1108) may include headers only to those mailbox IDs for which the user device (e.g., mobile phone 220) is configured to receive, as defined in SWD 238. The voicemail headers may be sent using XML data formatting.

For example, the voicemail message headers (signal 1108) sent to mobile phone 220 from VVM server 252 may include records 752 through 762 of aggregate message table 700. In one embodiment, signal 1108 may not include the audio files themselves (e.g., MSG*.QCP), but may include the names of the audio files. In another embodiment, signal 1108 may include the audio files themselves. In one embodiment, the voicemail message headers (signal 1108) sent to mobile phone 220 may include only the records from the aggregate message table (in VVM server 252) that have new or changed information.

The voicemail message list may be synchronized (block 1016). Mobile phone 220 may compare the voicemail message headers received in signal 1108 with voicemail message information stored in mobile phone 220 and may update its message table. For example, mobile phone 220 may update its aggregate message table from the condition shown in message table 700 to that shown in aggregate message table 700'. If mobile phone 220 does not include a message table with any information, then mobile phone 220 may create a message table corresponding to aggregate message table 700'.

Voicemail message audio files may be requested (block 1018). For example, mobile phone 220 may determine that the voicemail message list received indicates that a new voicemail audio file exists (e.g., MSG9.QCP corresponding to record 762). Mobile phone 220 may not have the corresponding audio file, e.g., mobile phone 220 may only have the header information. In this situation, mobile phone 220 may send a request message (signal 1112) for the audio file to VVM server 252. The request message (signal 1112) may include the device number (e.g., of mobile phone 220), the session cookie from the earlier authentication, and the mailbox and message IDs for the requested voicemail audio file. In one embodiment, the request message (signal 1112) may include the file format that the user device supports, such as QCP, MP3, AAC, Ogg Vorbis, etc.

VVM server 252 may receive the request (signal 1112) and may send a request (signal 1114) for the audio files to the appropriate one of VM servers 232-236 (block 1020). The request to wireless VM server 236 (signal 1114) may include, for example, the device number (e.g., of mobile phone 220), the PIN stored in device proxy 254 and/or VVM server 252 after authentication, the message ID, the location, the requested file format (e.g., QCP), and the mailbox ID. In one embodiment, the user device requesting an audio file may be a different device than the user device associated with the mailbox ID. For example, mobile phone 220 (primarily associated with mailbox MBC1 of wireless VM server 236) may request an audio file from mailbox MBB1 of home VM server 234 or from mailbox MBA1 of work VM server 232, as well as wireless VM server 236.

Voicemail audio file(s) may be received and forwarded (block 1021). For example, VVM server 252 may receive the voicemail audio files (signal 1116) and may forward the audio files (signal 1118) to mobile phone 220. One embodiment, mobile phone 220 may send multiple audio file request messages (e.g., signal 1112) for each new voicemail message mobile phone 220 decides to download. In this embodiment, VVM server 252 may send multiple request messages (e.g., signal 1114) to wireless VM server 236, wireless VM server 236 may respond with multiple messages (e.g., signal 1116), and VVM server 252 may send multiple audio files (e.g., signal 1118) to mobile phone 220. In another embodiment, the audio file request message (signal 1112) may include multiple mailbox and/or message IDs to identify multiple audio files, e.g., an audio file associated with each message ID. In one embodiment, mobile phone 220 may prompt the user of the device before sending an audio file request signal (signal 1112) because the user may not want to spend the time and/or bandwidth, for example, to download multiple audio files.

The transmission of one or more voicemail audio files may be interrupted (block 1022). The user may interrupt the downloading of audio files by interrupting the VVM device application, for example. In this situation (block 1022: YES), the downloading of voicemail messages may be stopped (block 1024) and a new voicemail notification message may display on the user device, e.g., mobile phone 220 (block 1026). If the downloading of audio files is not interrupted (block 1022: NO), then a new voicemail notification message may be displayed (block 1026) to the user after successful download of the audio files. An exemplary new voicemail notification is shown in FIG. 1B, discussed above.

The voicemail message headers may be displayed (block 1028). The voicemail message headers may include the caller number, the called number, the mailbox ID, etc. An exemplary list of voicemail headers is shown in FIG. 1C, discussed above. In one embodiment, the voicemail message headers are displayed after the user acknowledges the new voicemail message notification message in block 1026 by, for example, touching one of control keys 308 or display 306 on mobile phone 220. Voicemail messages may be displayed in order of when they were received, in order of urgency, etc.

A command to act on a voicemail message may be received (block 1030). For example, the user of mobile phone 220 may listen to a voicemail message, delete a voicemail message, save a voicemail message, etc. The GUI shown in FIG. 1C, for example, includes buttons 114 and 116 for deleting and playing a voicemail message, respectively.

Figure 12:
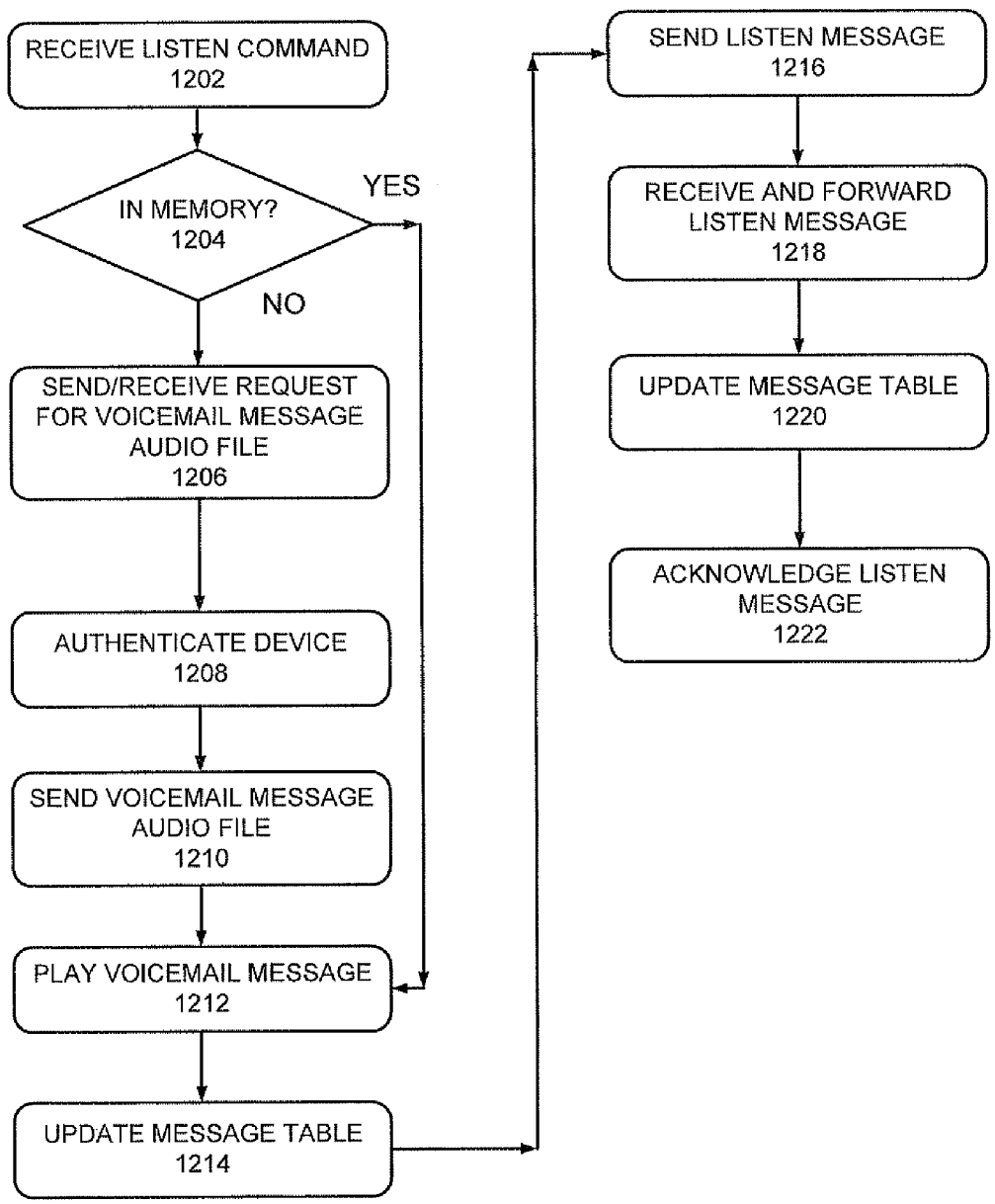
FIG. 12 is a flowchart of an exemplary process for listening to a voicemail message.
Figure 13:
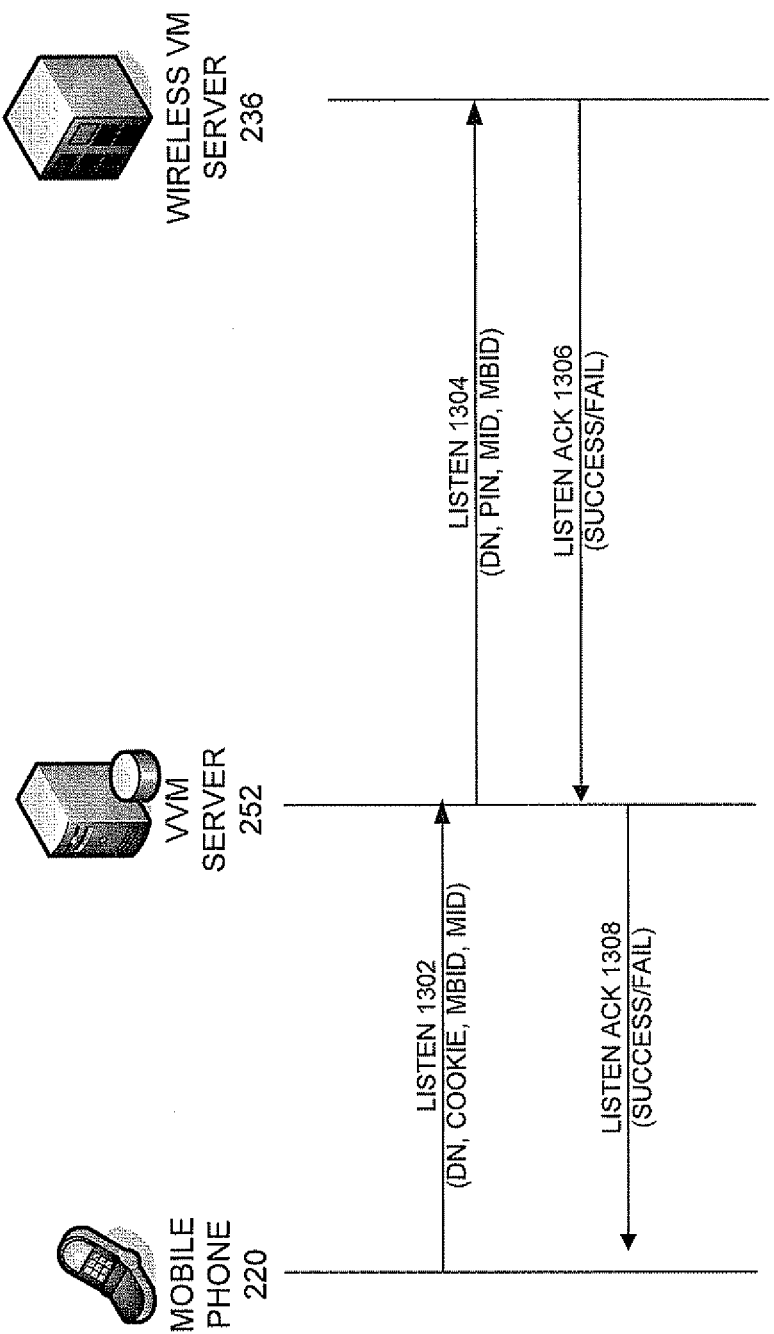
FIG. 13 is a diagram of exemplary network signals for listening to a voicemail message.

After a user device downloads voicemail message information, the user may decide to listen to a voicemail message. FIG. 12 is a flowchart of an exemplary process 1200 for listening to a voicemail message. Process 1200 is described with respect to FIG. 13, which is a diagram of exemplary network signals sent in network 200 for listening to a voicemail message. For the purposes of FIG. 13, device proxy 254, SMPP gateway 256, notification server 260, and VVM gateway 262 have been omitted for simplicity.

Process 1200 may begin when a user of a device, such as mobile phone 220, selects a message for listening to by, for example, using control keys 308, keypad 310, and/or touchscreen display 306. FIG. 1C shows a GUI for a user to input a command to listen to a message, for example. A LISTEN command may be received (block 1202). For example, a user device, such as mobile phone 220, may receive the LISTEN command from the user through the GUI shown in FIG. 1C. If the voicemail message audio file is in memory 460 of the user device (block 1204: YES), then the voicemail message may be played (block 1212). For example, mobile phone 220 may have already downloaded the voicemail message from wireless VM server 236 in block 1021.

If the voicemail message audio file is not in memory 460 of the user device (block 1204: NO), then the user device may request the audio file corresponding to the voicemail message. For example, mobile phone 220 may not have the corresponding audio file in memory 460 if the user interrupted the audio file download (FIG. 10, block 1022: YES) or if the user opted not to download the audio files. In this case, in one embodiment, mobile phone 220 may send an audio file request message, similar to signal 1112 of FIG. 11, to download the corresponding audio file (block 1206).

The user device may be authenticated (block 1208). For example, device proxy 254 and/or VVM server 252 may authenticate mobile phone 220 using, for example, a session cookie sent in the audio file request (similar to signal 1112). The audio file may be sent (block 1210). For example, VVM server 252 may send a request (similar to signal 1114) to wireless VM server 236 and may receive the audio file (similar to signal 1116). VVM server 252 and may send the audio file (similar to signal 1118) to mobile phone 220 for playing to the user (block 1212). In one embodiment, the audio file may be streamed from wireless VM server 236 to mobile phone 220 for playing to the user (block 1212).

The message table in the user device may be updated (block 1214), e.g., the state of the listened-to voicemail message may be changed. For example, the state of the voicemail message may be changed from NEW to HEARD or SAVE (e.g., in message table 464). A LISTEN message (e.g., a state change message) may be sent to a VM server (block 1216). For example, after playing the voicemail message, mobile phone 220 may send a LISTEN message (signal 1302) to VVM server 252. The LISTEN message (signal 1302) may include the device number (e.g., of mobile phone 220), the session cookie (for authentication), and the mailbox and message IDs corresponding to the listened-to message.

The LISTEN message may be received and forwarded (block 1218). For example, VVM server 252 may receive the message (signal 1302) and may forward the message (signal 1304) to VM server 236. The LISTEN message (signal 1304) sent to wireless VM server 236 may include the device number (e.g., of mobile phone 220), the message and mailbox IDs of the listened-to message, and the PIN corresponding to the mailbox ID. VVM server 252 and/or device proxy 254 may store the appropriate PIN, for example, for the corresponding mailbox ID. In one embodiment, the user device sending the LISTEN message may be a different device than the user device primarily associated with the mailbox ID. For example, mobile phone 220 (primarily associated with mailbox MBC1 of wireless VM server 236) may send a LISTEN message to mailbox MBB1 of home VM server 234 (primarily associated with PDA 218) or mailbox MBA1 of work VM server 232 (primarily associated with smart phone 216).

The VM server may update the message table (block 1220) corresponding to the message ID. For example, wireless VM server 236 may update message table 600-3 to change the state of a message from NEW to HEARD. Likewise, VVM server 252 may also update its aggregate message table, such as message table 700, to change the state of the message from NEW to HEARD. The LISTEN message may be acknowledged (block 1222). Wireless VM server 236 may send an acknowledgment message (signal 1306) to VVM server 252, which may be received and forwarded as an acknowledgment message (signal 1308) to the user device, e.g., mobile phone 220.

In another embodiment, a user device (e.g., mobile phone 220) may update a VM server (e.g., wireless VM server 236) with state changes (e.g., a LISTEN message) at a different time, such on a periodic basis or when the user terminates the VVM application in the user device. In one embodiment, the user device may not change the state of a message in its memory until it receives an acknowledgment from the VM server.

Figure 14:
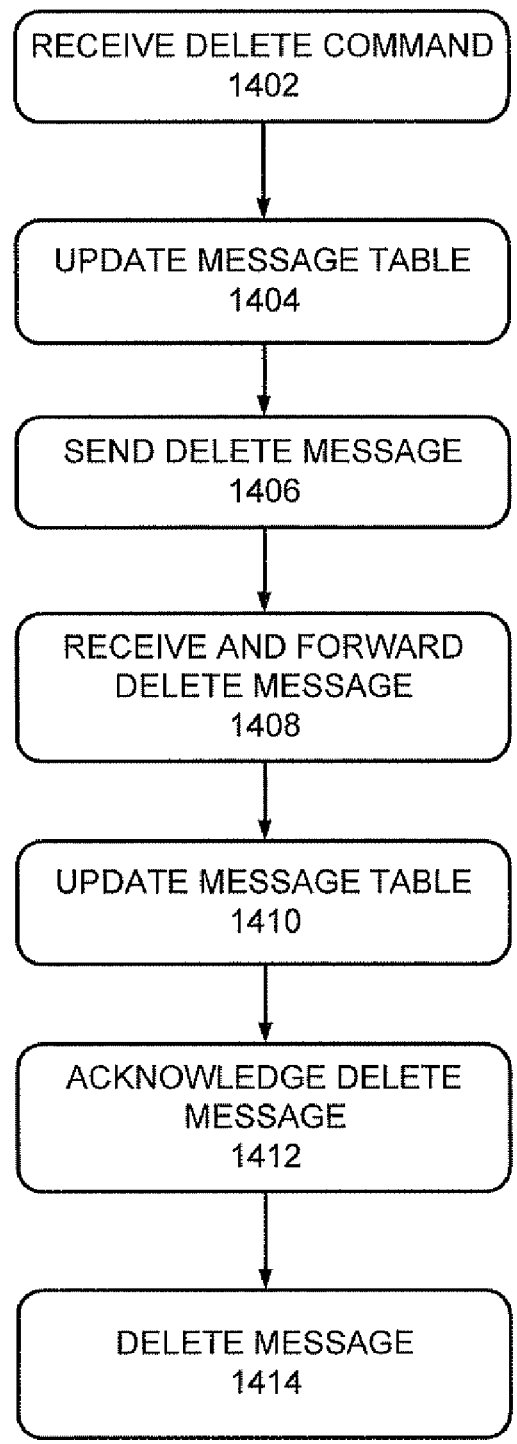
FIG. 14 is a flow chart of an exemplary process for deleting a voicemail message.
Figure 15:
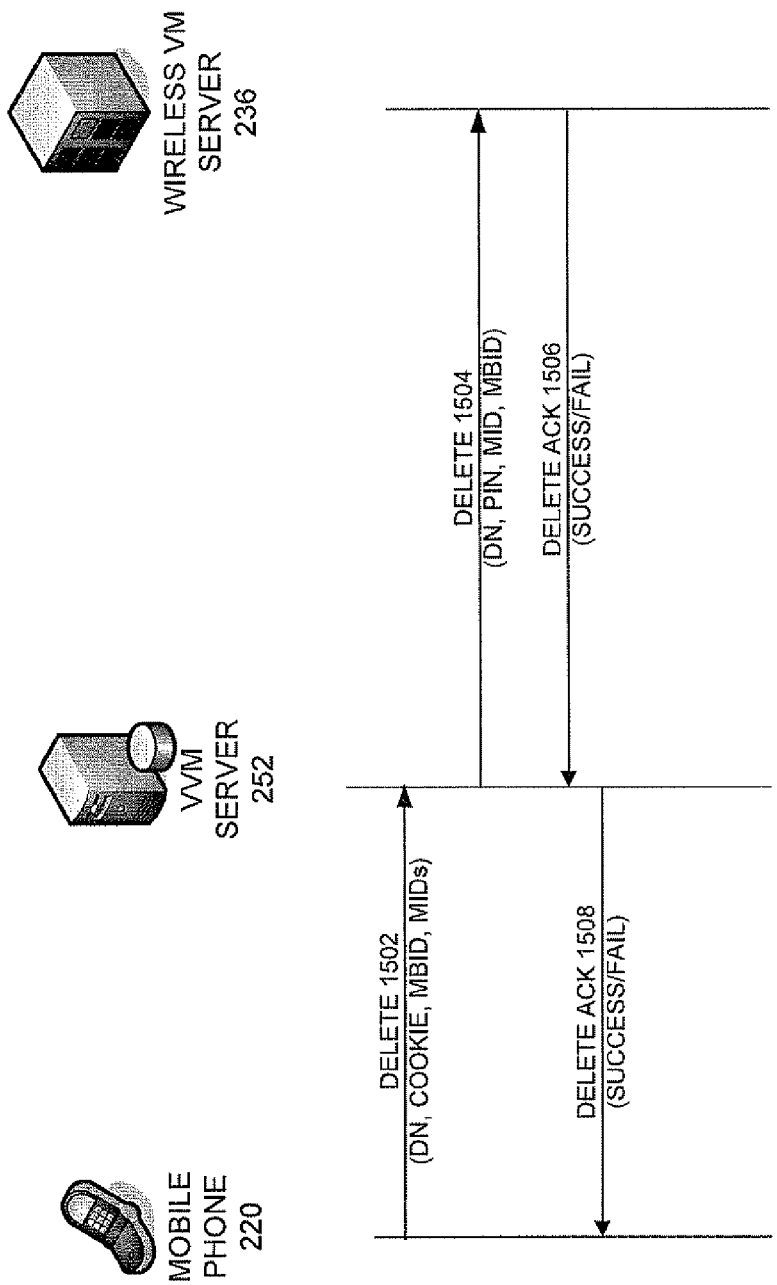
FIG. 15 is a diagram of exemplary network signals for deleting a voicemail message.

After a user device downloads voicemail message information, the user may decide to delete a voicemail message. FIG. 14 is a flow chart of an exemplary process 1400 for deleting a voicemail message. Process 1400 is described with respect to FIG. 15, which is a diagram of exemplary network signals sent in network 200 for deleting a voicemail message. For the purposes of FIG. 15, device proxy 254, SMPP gateway 256, notification server 260, and VVM gateway 262 have been omitted for simplicity.

Process 1400 may begin with a user of a device, such as mobile phone 220, selecting a message for deletion using, for example, control keys 308, keypad 310, and/or touch-screen display 306. An exemplary GUI for a user to input a DELETE command is shown in FIG. 1D. A DELETE command may be received (block 1402). For example, the user device, such as mobile phone 220, may receive a command to delete a voicemail message from the user. The message table in the user device may be updated (block 1404), e.g., the state of the selected voicemail message may be changed. For example, the user device, such as mobile phone 220, may change the tag in state field 610 in the corresponding record of message table 700 from HEARD to DELETED.

A DELETE message, e.g., a state change message, may be sent (block 1406). For example, mobile phone 220 may send a DELETE message (signal 1502) to VVM server 252. The DELETE message (signal 1502) may include the device number (e.g., of mobile phone 220), the session cookie (for authentication), and the mailbox and message IDs corresponding to the message to delete.

The DELETE message may be received and forwarded (block 1408). For example, VVM server 252 may receive the DELETE message (signal 1502) and may authenticate mobile phone 220 using the session cookie in the DELETE message (signal 1502). VVM server 252 may forward the DELETE message (signal 1504) to the appropriate VM server, such as wireless VM server 236. The DELETE message (signal 1504) may include the device number (e.g., of mobile phone 220), the message and mailbox IDs corresponding to the message to delete, and the PIN corresponding to the mailbox ID. VVM server 252 may store the PIN associated with the appropriate mailbox IDs, for example.

The message table may be updated (block 1410). The VM server that received the DELETE message may update the state information corresponding to the message ID. For example, wireless VM server 236 may change the state of the corresponding message ID from HEARD to DELETE (e.g., in message table 600-3). In one embodiment, VVM server 252 may also update its message table, e.g., aggregate message table 700. The DELETE message may be acknowledged (block 1412). VVM server 252 may receive an acknowledgment message (signal 1506) from wireless VM server 236 that may be forwarded as an acknowledgment message (signal 1508) to mobile phone 220.

The voicemail message (e.g., audio file) may be deleted (block 1414). The VM server, such as wireless VM server 236, may also delete the audio file corresponding to the message ID (block 1414). If the audio file corresponding to the voicemail message is in memory of the device, e.g., mobile phone 220, then the audio file corresponding to the message may be deleted from the device memory, e.g., from memory 460 of mobile phone 220.

In one embodiment, the user device sending the DELETE message may be a different device than the user device primarily associated with the mailbox ID. For example, mobile phone 220 (primarily associated with wireless VM server 236 and MBC1) may send a DELETE message to mailbox MBB1 of home VM server 234 (primarily associated with PDA 218) or mailbox ID of MBA1 of work VM server 232 (primarily associated with smart phone 216).

In another embodiment, the user device (e.g., mobile phone 220) may update the VM server (e.g., wireless VM server 236) with the DELETE message (e.g., a state change) at a different time, such as on a periodic basis or when the user terminates the VVM application in the user device. In one embodiment, mobile phone 220 may not change the state of a message in its memory until it receives an acknowledgment from wireless VM server 236. In one embodiment, more than one message be deleted in a single DELETE message, e.g., in signal 1502.

In one embodiment, the user device and/or VM server may not actually delete the record in the message tables or the audio files. Instead, the user device and/or VM server may only mark the message for deletion (e.g., put it in a "recycle bin"). The user device and/or VM server may delete the record in the message tables and the audio files when prompted by the user (e.g., to "empty the recycle bin") or when, for example, memory in the device or VM server is limited.

Figure 16:
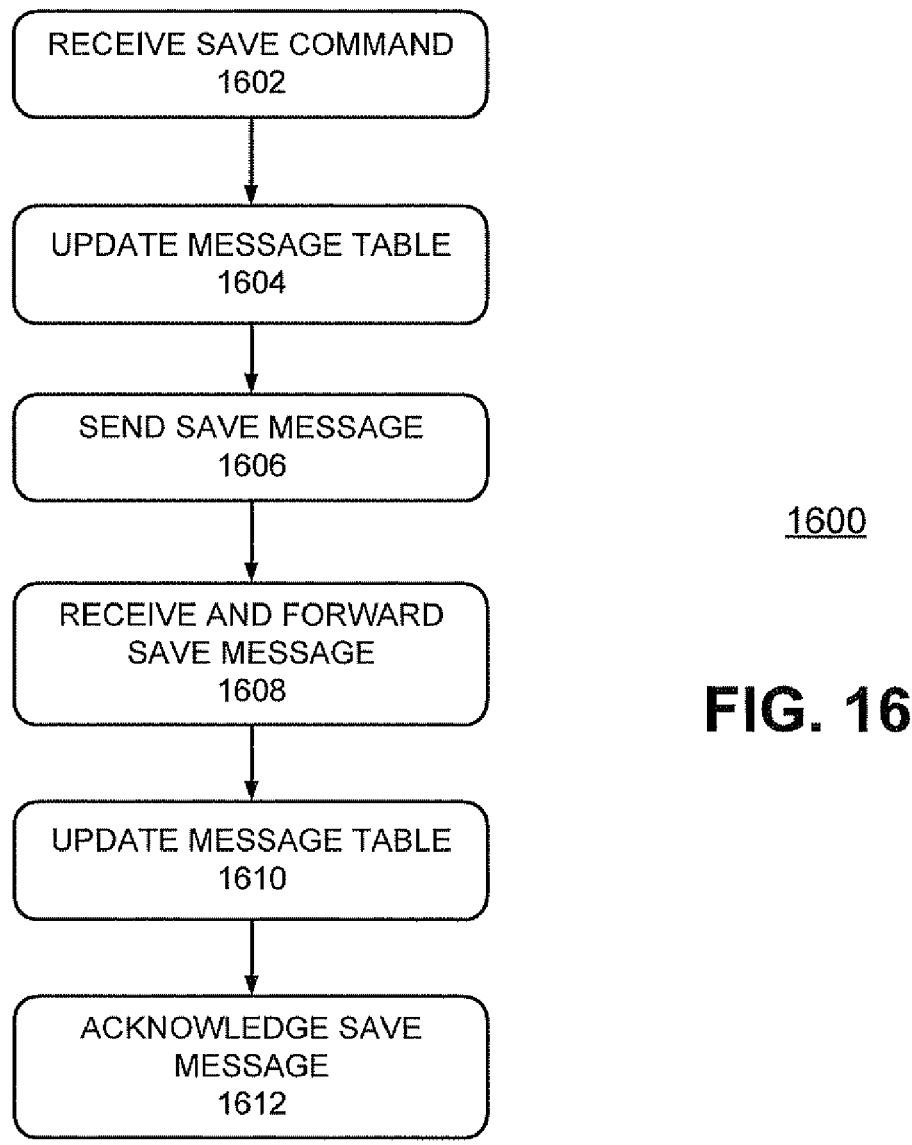
FIG. 16 is a flowchart of an exemplary process for saving a voicemail message.
Figure 17:
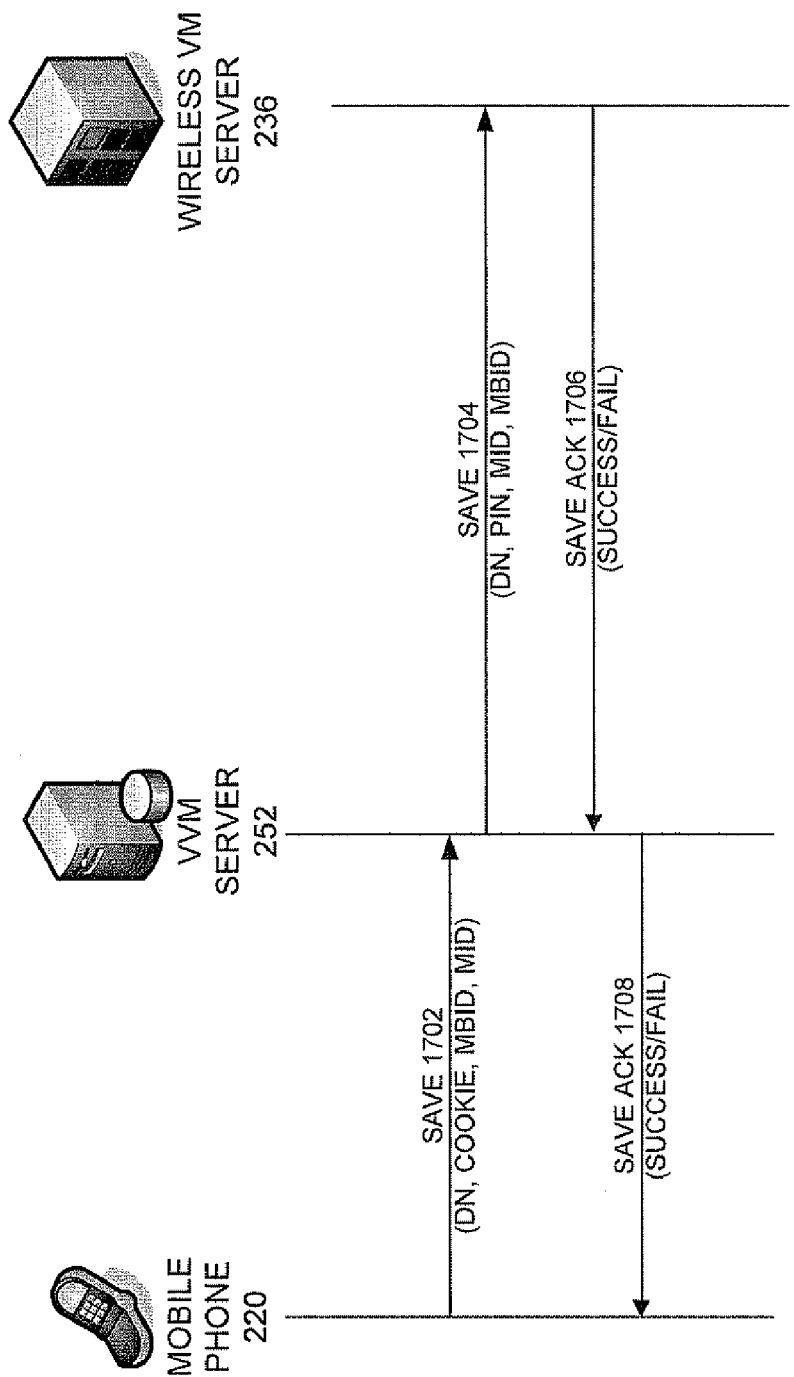
FIG. 17 is a diagram of exemplary network signals for saving a voicemail message.

After a user device downloads voicemail message information, the user may decide to save a voicemail message. FIG. 16 is a flowchart of an exemplary process 1600 for saving a voicemail message. FIG. 16 is described with respect to FIG. 17, which is a diagram of exemplary network signals sent in network 200 to save a message. For the purposes of FIG. 17, device proxy 254, SMPP gateway 256, notification server 260, and VVM gateway 262 have been omitted for simplicity.

Process 1600 may begin when a user of a user device selects a message for saving using, for example, control keys 308, keypad 310, and/or touch-screen display 306. An exemplary GUI for a user to input a SAVE command is shown in FIG. 1D. A SAVE command may be received (block 1602). For example, mobile phone 220 may receive a SAVE command from the user. The message table may be updated (block 1604). For example, the state for the selected message in the message table stored in mobile phone 220 (e.g., message table 464) may be changed from HEARD to SAVE.

A SAVE message, e.g., a state change message, may be sent (block 1606). For example, mobile phone 220 may send a SAVE message (signal 1702) to VVM server 252. The SAVE message (signal 1702) may include the device number (e.g., of mobile phone 220), the session cookie (for authentication), and the mailbox and message IDs associated with the message to save. VVM server 252 and/or device proxy 254 may authenticate mobile phone 220 using the session cookie in the SAVE message (signal 1702).

The SAVE message may be received and forwarded (block 1608). For example, VVM server 252 may receive the SAVE message (signal 1702) and may forward the SAVE message (signal 1704) to the appropriate VM server, e.g., wireless VM server 236. The SAVE message (signal 1704) may include the device number (e.g., of mobile phone 220), the message and mailbox IDs associated with the message to save, and the PIN associated with the mailbox ID. In one embodiment, VVM server 252 may have stored the appropriate PIN for the mailbox ID. In one embodiment, the user device sending the SAVE message may be a different device than the user device primarily associated with the mailbox ID. For example, mobile phone 220 (primarily associated with mailbox MBC1 of wireless VM server 236) may send a SAVE message to mailbox MBB1 of home VM server 234 (primarily associated with MBB1) or mailbox MBA1 of work VM server 232 (primarily associated with MBA1).

The message table may be updated (block 1610). The VM server that received the SAVE command may update the message in the message table corresponding to the message ID. For example, wireless VM server 236 may update its message table (e.g., message table 600-3) to change the state of the corresponding message from HEARD to SAVE. The SAVE message may be acknowledged (block 1612). For example, VVM server 252 may receive an acknowledgment message (signal 1706) from wireless VM server 236 may send an acknowledgment message (signal 1708) to mobile phone 220.

In another embodiment, the user device (e.g., mobile phone 220) may send a SAVE message (e.g., state change message) to wireless the VM server at a different time, such as on a periodic basis or when the user terminates the VVM application. In one embodiment, the user device (e.g., mobile phone 220) may not update its message table until it receives an acknowledgment from the VM server. In one embodiment, more than one message be saved in a single SAVE message, e.g., in signal 1702.

Figure 18:
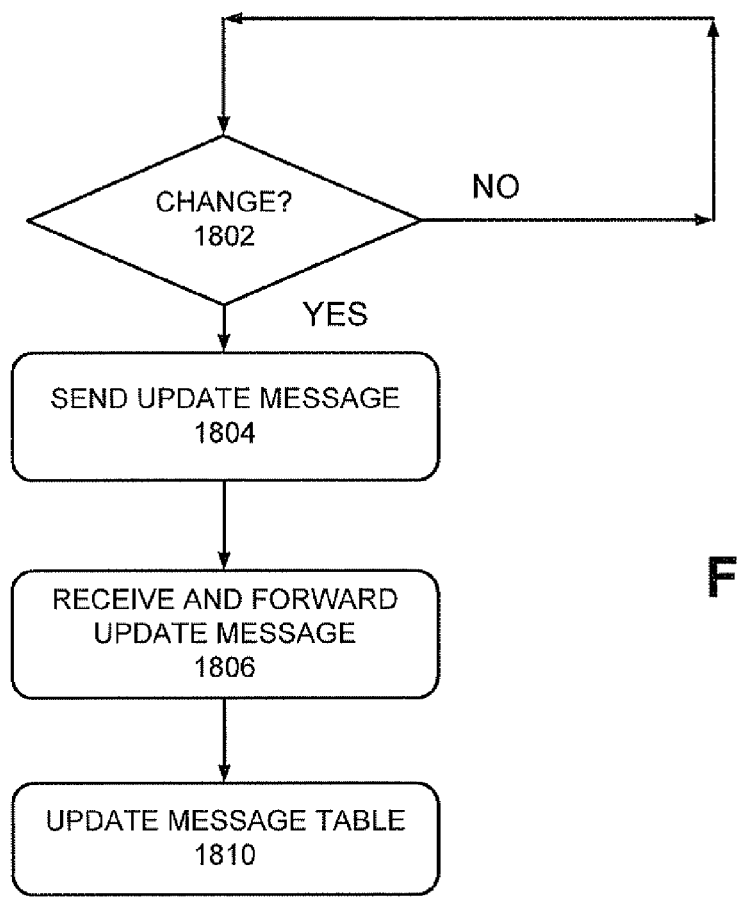
FIG. 18 is a flowchart of an exemplary process for changing the state of a voicemail message.

After a user device downloads voicemail message information, the user may perform various operations on a voicemail message. FIG. 18 is a flowchart of an exemplary process 1800 for updating or changing message tables in network 200. Process 1800 may be considered a more general form of parts of processes 1200, 1400, and 1600. Process 1800 may begin after a user device receives a command to act on a voicemail message, for example, and updates the message table stored in the device. For example, a user may enter a command into a user device to change the state of a message from "SAVE" to "NEW." In this case, the user device may update its message table to change the state of a message from "SAVE" to "NEW."

Process 1800 may be triggered by a change to any part of the message table stored in the user device (e.g., message table 464). If the message table changes (block 1802: YES), then an UPDATE message, e.g., a state change message, may be sent (block 1804). If there is no change in the message table (block 1802: NO), then process 1800 may wait until there is a change.

The UPDATE message may include a list of voicemail messages and the corresponding change and may be sent to VVM server 252 or any one of VM servers 232-236. The UPDATE message may identify the messages to update by their corresponding mailbox and message IDs. The UPDATE message may also include a session cookie to authenticate the user device, for example. Examples of UPDATE messages include the LISTEN, DELETE, and SAVE messages described above.

The UPDATE message may be received and forwarded (block 1806). For example, VVM server 252 may receive the UPDATE message and may be forwarded to the appropriate VM server. The message table may be updated (block 1810). For example, the VM server that received the UPDATE message may update its message table. In addition, VVM server 252 may also update the aggregate message table.

In one embodiment, methods and systems described above may allow for the management of email as well as voicemail.

U.S. patent application Ser. No. 12/236,808, titled "MANAGING VISUAL VOICEMAIL FROM MULTIPLE DEVICES," filed Sep. 24, 2008, is incorporated herein by reference.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  storing aggregate voicemail message information in an aggregate database, the aggregate voicemail message information including voicemail message information associated with a first device number and voicemail message information associated with a second device number;
  retrieving updated voicemail message information associated with the first device number from a first database, where the first database, different from the aggregate database, stores the voicemail message information associated with the first device number and the updated voicemail message information associated with the first device number;
  retrieving updated voicemail message information associated with the second device number from a second database, where the second database, different from the first database and the aggregate database, stores the voicemail message information associated with the second device number and the updated voicemail message information associated with the second device number;
  updating the aggregate voicemail message information stored in the aggregate database based on the retrieved updated voicemail message information associated with the first device number and based on the retrieved updated voicemail message information associated with the second device number, wherein the aggregate voicemail message information includes an identifier to identify each voicemail message;
  transmitting a notification message to a user device associated with the first device number, wherein the notification message indicates the identifier of a most recently received new voicemail message, and wherein the notification message includes a first number, wherein the first number indicates a number of new voicemail messages associated with the first device number or the second device number;
  receiving a request from the user device, in response to the notification message, for the updated aggregated voicemail message information; and
  transmitting the updated aggregate voicemail message information, in response to the request from the user device, to the user device associated with the first device number.

2. The method of claim 1, further comprising:
  receiving, from the user device, an indication of a change of state of a voicemail message associated with the aggregate voicemail information stored in the aggregate database; and
  updating the aggregate database based on the indication of the change of state.

3. The method of claim 2, further comprising:
  updating the first or second database based on the indication of the change of state.

4. The method of claim 1,
  wherein the notification message includes a Short Message System (SMS) message,
  wherein the notification message includes an association of the identifier of the most recently received new voicemail message with the first device number or the second device number, and
  wherein the notification message includes a second number, wherein the second number indicates a total number of voicemail messages associated with the first device number or the second device number.

5. The method of claim 3, where the state or the change of state includes an indication that the voicemail message was heard, saved, or deleted by a user of the first user device.

6. The method of claim 1,
  where retrieving the updated voicemail message information associated with the first device number includes receiving, over a network from a first network device storing the first database, the updated voicemail message information associated with the first device number; and where retrieving the updated voicemail message information associated with the second device number includes receiving, over a network from a second network device storing the second database, the updated voicemail message information associated with the second device number.

7. A network device comprising:

a memory to store an aggregate database, the aggregate database storing aggregate voicemail message information, the aggregate voicemail message information including voicemail message information associated with a first device number and voicemail message information associated with a second device number;

a receiver to receive, over a network, updated voicemail message information associated with the first device number and stored in a first database different from the aggregate database, and to receive, over the network, updated voicemail message information associated with the second device number and stored in a second database different from the first database and the aggregate database;

a processor to update the aggregate voicemail message information stored in the aggregate database based on the received updated voicemail message information associated with the first device number and based on the received updated voicemail message information associated with the second device number, wherein the aggregate voicemail message information includes an identifier for each voicemail message; and a transmitter to send a notification message to a user device associated with the first device number, wherein the notification message indicates the identifier of a voicemail message that was most recently received, and wherein the notification message includes a first number and a second number, wherein the first number indicates a number of new voicemail messages associated with the first device number or the second device number and the second number a total number of voicemail messages associated with the first device number or the second device number, wherein the receiver is configured to receive a request from the user device, in response to the notification message, for the updated aggregated voicemail message information; and wherein the transmitter is configured to send the updated aggregate voicemail message information to the user device associated with the first device number.

8. The network device of claim 7, where the receiver receives, from the user device, a first indication of a change of state of a voicemail message associated with the aggregate voicemail information stored in the aggregate database, where the processor updates the aggregate database based on the first indication of the change of state, and where the transmitter sends a second indication over the network for updating the first or second database based on the first indication of the change of state.

9. The network device of claim 8, where the state or the change of state includes an indication that the voicemail message was heard, saved, or deleted by a user of the first user device.

10. A system comprising:

an aggregate database to store:

first voicemail message information associated with a first device number and stored in a first database, and second voicemail message information associated with a second device number and stored in a second database, wherein the aggregate database is different than the first database and the second database, and the first database is different than the second database, and wherein the aggregate voicemail message information includes an identifier for each voicemail message;

one or more processors to update the voicemail message information stored in the aggregate database based on updated voicemail message information stored in the first database and updated voicemail message information stored in the second database; and a transmitter to send a notification message to a user device associated with the first device number, wherein the notification message indicates the identifier of a most recently received new voicemail message, and wherein the notification message includes a first number, wherein the first number indicates a number of new voicemail messages associated with the first device number or the second device number.

11. The system of claim 10, further comprising:

a receiver to receive a request from the user device, in response to the notification message, for the updated aggregate voicemail message information, wherein the transmitter is configured to send the updated aggregate voicemail message information to the user device in response to the request.

12. The system of claim 11, wherein the notification message includes an association of the identifier of the most recently received new voicemail message with the first device number or the second device number.

13. The system of claim 12, wherein the notification message includes a Short Message System (SMS) message, and wherein the notification message indicates a second number, wherein the second number indicates a total number of voicemail messages associated with the first device number or the second device number.

14. The system of claim 11, wherein the system includes the user device, the user device comprising:

a receiver to receive the notification message and the updated aggregate voicemail message information;

a memory to store another aggregate database for storing the received aggregate voicemail message information; and a processor to compare the identifier, received in the notification message, of the most recently received new voicemail message with information stored in the other aggregate database and to determine, based on the comparison, to transmit the request for the updated aggregate voicemail message information.

15. The system of claim 11, wherein the receiver is configured to receive a state change notification, where the state change notification indicates that a state of a voicemail message associated with the aggregate voicemail message information has changed, and wherein the one or more processors update the aggregate database based on the change of state notification and update the first or second database based on the change of state notification.

16. The system of claim 15, where the state or the changed of state includes an indication that the voicemail has been deleted, heard, or saved.

17. A method comprising:
    storing an aggregate database, where the aggregate database aggregates first voicemail message information associated with a first device number stored in a first database and second voicemail message information associated with a second device number stored in a second database, where the aggregate database is different than the first database and the second database, and the first database is different than the second database, wherein the aggregate voicemail message information includes an identifier to identify each voicemail message;
    receiving a notification message from a network device including an identifier of a voicemail message that was most recently received by the network device wherein the notification message includes a first number, wherein the first number indicates a number of new voicemail messages associated with the first device number or the second device number;
    comparing the received identifier with the identifiers in the aggregate database;
    transmitting a request message, based on the comparison, to the network device requesting updated aggregate voicemail message information;
    receiving the updated aggregate voicemail message information from the network device;
    updating the aggregate database based on the received updated aggregate voicemail message information; and
    displaying the updated aggregate voicemail message information to a user.

18. The method of claim 17, wherein the notification message includes an association of the identifier of the voicemail message with the first device number or the second device number.

19. The method of claim 17, further including:
    changing a state of a voicemail message associated with the aggregate voicemail message information stored in the aggregate database; and
    transmitting an indication of the change of state to the network device for updating the aggregate database and the first or second database based on the indication of the change of state.

20. The method of claim 19, further including:
    updating the other aggregate database and the first or second database based on the indication of the changed of state.

21. The method claim 19, where the state or the change of state includes an indication that the voicemail has been deleted, heard, or saved.

22. A communications device comprising:
    a memory to store an aggregate database to aggregate first voicemail message information associated with a first device number stored in a first database and second voicemail message information associated with a second device number stored in a second database, where the aggregate database is different than the first database and the second database, and the first database is different than the second database, wherein the aggregate voicemail message information includes an identifier to identify each voicemail message;
    a receiver to receive a notification message from a network device including an identifier of a voicemail message that was most recently received, wherein the notification message includes a first number, wherein the first number indicates a number of new voicemail messages associated with the first device number or the second device number;
    a processor to compare the received identifier with the identifiers stored in the aggregate database;
    a transmitter to transmit a request message, based on the comparison by the processor, to the network device requesting updated voicemail message information from the network device;
    wherein the receiver is configured to receive the updated voicemail message information from the network device and the processor is configured to update the voicemail message information stored in the aggregate database based on the received updated voicemail message information; and
    a display to present the updated aggregate voicemail message information to a user.

23. The communication device of claim 22, wherein the notification message includes an association of the identifier of the voicemail message with the first device number or the second device number.

24. The communication device of claim 23,
    wherein the processor changes a state of a voicemail message associated with the aggregate voicemail message information stored in the aggregate database, and
    wherein the transmitter sends an indication of the change of state to the network device for updating another aggregate database based on the indication of the changed state and to update the first or second database based on the indication of the changed state.

25. The system of claim 24, where the state or the change of state includes an indication that the voicemail has been deleted, heard, or saved.

* * * * *